(12) United States Patent
Youn et al.

(10) Patent No.: US 11,387,866 B2
(45) Date of Patent: *Jul. 12, 2022

(54) DEVICE AND METHOD FOR TRANSMITTING DATA IN WIRELESS POWER TRANSMISSION SYSTEM

(71) Applicant: LG ELECTRONICS INC., Seoul (KR)

(72) Inventors: Jinho Youn, Seoul (KR); Jaeyeol Kim, Seoul (KR); Seonghun Lee, Seoul (KR); Hyokune Hwang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/170,322

(22) Filed: Feb. 8, 2021

(65) Prior Publication Data

US 2021/0167816 A1 Jun. 3, 2021

Related U.S. Application Data

(63) Continuation of application No. 16/839,714, filed on Apr. 3, 2020, now Pat. No. 10,931,332, which is a
(Continued)

(30) Foreign Application Priority Data

Sep. 3, 2018 (KR) .................. 10-2018-0104800

(51) Int. Cl.
*H04B 5/00* (2006.01)
*H02J 50/80* (2016.01)
(Continued)

(52) U.S. Cl.
CPC ............. *H04B 5/0037* (2013.01); *H02J 7/02* (2013.01); *H02J 50/12* (2016.02); *H02J 50/40* (2016.02);
(Continued)

(58) Field of Classification Search
CPC .. H02J 50/80; H02J 50/12; H02J 7/025; H02J 50/40; H02J 7/00034; H02J 50/10;
(Continued)

(56) References Cited

U.S. PATENT DOCUMENTS 9,941,755 B2 4/2018 Hwang
9,997,951 B2 6/2018 Lee et al.
(Continued)

FOREIGN PATENT DOCUMENTS

| KR | 10-2015-0014504 A | 2/2015 |
| KR | 10-2018-0074461 A | 7/2018 |
| WO | WO 2015/072778 A1 | 5/2015 |

*Primary Examiner* — Golam Sorowar
(74) *Attorney, Agent, or Firm* — Birch, Stewart, Kolasch & Birch, LLP

(57) ABSTRACT

A wireless power receiver for receiving wireless power from a wireless power transmitter and for transmitting a control packet to the wireless power transmitter in a wireless power transfer system, includes a power pick-up unit configured to receive wireless power from the wireless power transmitter via magnetic coupling with the wireless power transmitter, and to convert an AC signal generated by the wireless power to a DC signal, a communication/control unit configured to receive the DC signal from the power pick-up unit, and to perform control of the wireless power and a load configured to receive the DC signal from the power pick-up unit, wherein the communication/control unit is configured to transmit a control error packet including a control error value for the wireless power to the wireless power transmitter in a first time interval or a second time interval.

20 Claims, 24 Drawing Sheets

Related U.S. Application Data continuation of application No. PCT/KR2019/010964, filed on Aug. 28, 2019.

(51) Int. Cl.
*H02J 50/12* (2016.01)
*H02J 50/40* (2016.01)
*H02J 50/60* (2016.01)
*H02J 7/02* (2016.01)

(52) U.S. Cl.
CPC .............. *H02J 50/60* (2016.02); *H02J 50/80* (2016.02); *H04B 5/0031* (2013.01)

(58) Field of Classification Search
CPC .... H02J 50/90; H02J 50/60; H02J 7/02; H02J 5/005; H02J 50/402; H02J 7/04; H02J 50/20; H02J 7/0047; H02J 7/00045; H02J 7/007; H02J 7/00308; H02J 7/045; H02J 7/00; H02J 7/00036; H04B 5/0037; H04B 5/0031; H04B 5/0075; H04B 5/0081; H04B 5/0087; H04B 5/02; H04B 17/364; H04B 5/00; H04B 5/0025; H04B 5/0093; H02M 7/48; H02M 1/007; H02M 1/0058; H02M 1/32; H02M 3/003; H02M 3/156; H02M 3/158; H02M 3/1582; H02M 3/337; H02M 5/005; H02M 7/217; H02M 7/46; H02M 7/4815; H02M 7/4818; H02M 7/5387; H02M 7/53871; H04W 12/069; H04W 4/80; H04W 48/16; H04W 48/20; H04W 4/02; H04W 4/50; H04W 52/0225; H04W 52/0229; H04W 52/0245; H04W 52/367; H04W 52/48; H04W 52/54; H04W 52/58; H04W 56/001; H04W 72/0406; H04W 72/0446; H04W 76/14; H04W 84/10; H04W 84/12

See application file for complete search history.

(56) References Cited

U.S. PATENT DOCUMENTS

| | | | |
|---|---|---|---|
| 2016/0352155 A1* | 12/2016 | Iwasaki | H02J 5/005 |
| 2016/0372956 A1* | 12/2016 | Jung | H02J 50/80 |
| 2017/0098967 A1* | 4/2017 | Bae | H02J 7/025 |

* cited by examiner

FIG. 3B

|  | b7 | b6 | b5 | b4 | b3 | b2 | b1 | b0 |
|---|---|---|---|---|---|---|---|---|
| Byte 0 | colspan="8" | Application Profile ||||||||
| Byte 1 | Version ||||||||
| Byte 2-N-1 | Profile-specific data ||||||||

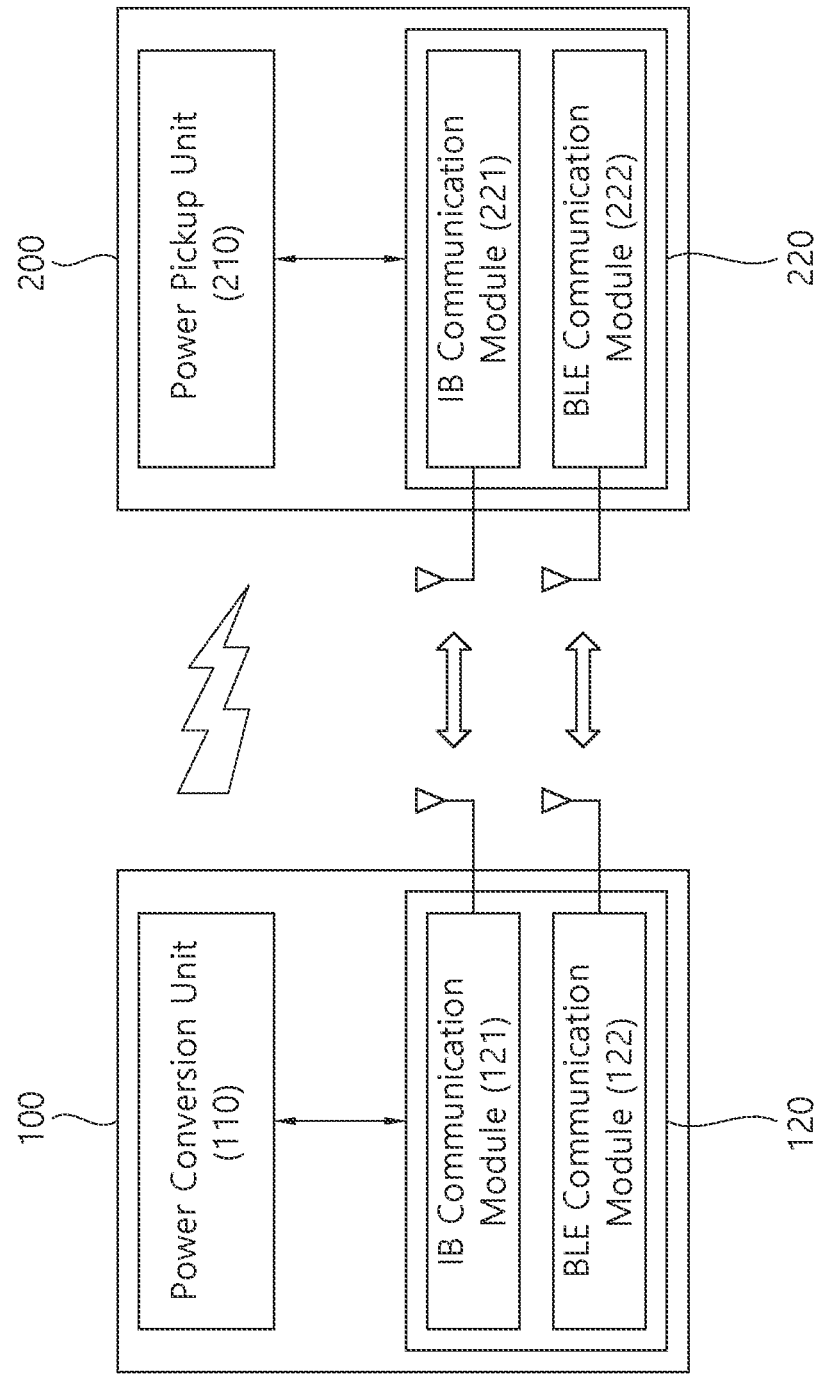

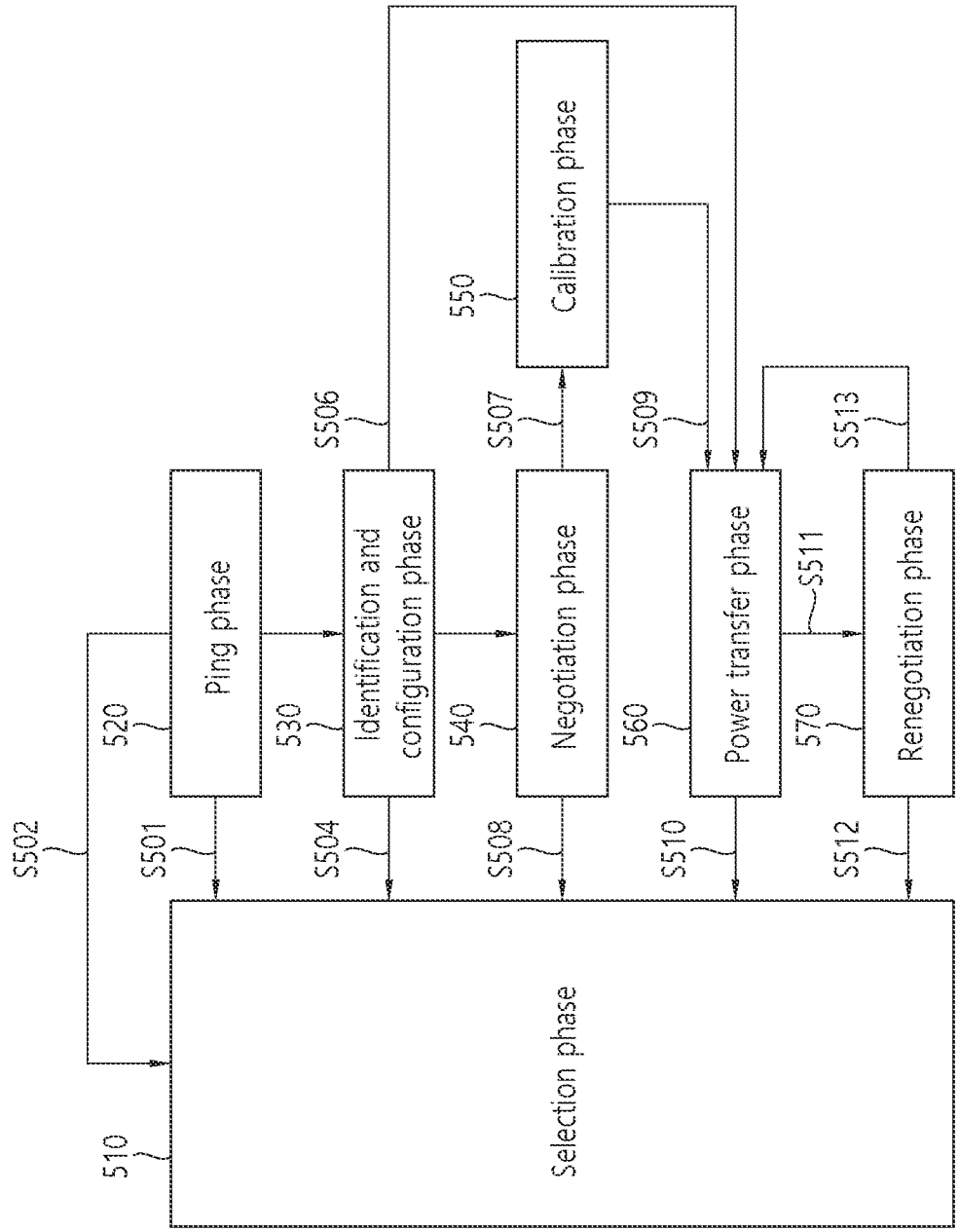

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

| | b7 | b6 | b5 | b4 | b3 | b2 | b1 | b0 |
|---|---|---|---|---|---|---|---|---|
| B0 | \multicolumn{8}{l}{Qi Authentication Certification Structure Version} |
| B1 | \multicolumn{6}{l}{Reserved} | PTx Leaf | Certificate Type |
| B2 | \multicolumn{8}{l}{Signature Offset} |
| B3 ... B11 | MSB | | | | | | | Serial Number ... LSB |
| B12 ... B17 | \multicolumn{8}{l}{Issuer ID} |
| B18 ... B23 | \multicolumn{8}{l}{Subject ID} |
| B25 ... B56 | \multicolumn{8}{l}{Public Key} |
| B57 ... B120 | \multicolumn{8}{l}{Signature} |

Certificate Format

DEVICE AND METHOD FOR TRANSMITTING DATA IN WIRELESS POWER TRANSMISSION SYSTEM

CROSS-REFERENCE TO RELATED APPLICATIONS

This application is a Continuation of U.S. application Ser. No. 16/839,714, filed on Apr. 3, 2020 (now U.S. Pat. No. 10,931,332, issued on Feb. 23, 2021), which is Continuation of PCT International Application No. PCT/KR2019/010964, filed on Aug. 28, 2019, which claims priority under 35 U.S.C. 119(a) to Korean Patent Application No. 10-2018-0104800, filed in Republic of Korea on Sep. 3, 2018, all of these applications are hereby expressly incorporated by reference into the present application.

BACKGROUND OF THE INVENTION

Field of the Invention

The present disclosure relates to wireless power transmission and, more particularly, to an apparatus and a method for transmitting data in a wireless power transmission system.

Discussion of the Related Art

Wireless power transmission technology is a technology that transmits electrical power without wires between a power source and an electronic device. As one example, the wireless power transmission technology allows the battery of a wireless terminal such as a smartphone or tablet to be charged simply by placing the wireless terminal on a wireless charging pad, thereby providing better mobility, convenience, and safety than the existing wired charging environment using a wired charging connector. The wireless power transmission technology is getting great attention as a means to replace the existing wired power transmission environment not only for wireless charging of wireless terminals but also for various other applications including electric vehicle, wearable device such as Bluetooth earphones or 3D glasses, home appliance, furniture, underground facility, building, medical device, robot, and leisure.

Wireless power transmission is also called contactless power transmission, no point of contact power transmission, or wireless charging. A wireless power transmission system may comprise a wireless power transmitter providing electrical energy through a wireless power transmission method and a wireless power receiver receiving electrical energy transmitted wirelessly from the wireless power transmitter and supplying power to a power receiving device such as a battery cell.

The wireless power transmission technology encompasses various methods such as a method for transmitting power through magnetic coupling, method for transmitting power through radio frequency (RF), method for transmitting power through microwaves, and method for transmitting power through ultrasonic waves. Magnetic coupling based methods are further divided into magnetic induction and magnetic resonance methods. The magnetic induction method transmits energy by using currents induced in a receiver-side coil due to the magnetic field generated at a transmitter-side coil battery cell according to electromagnetic coupling between the transmitter-side coil and the receiver-side coil. The magnetic resonance method is similar to the magnetic induction method in that it uses a magnetic field. However, the magnetic resonance method is different from the magnetic induction method in that resonance is generated when a specific resonant frequency is applied to the transmitter-side and receiver-side coils; and energy is transferred as a magnetic field is concentrated due to the generated resonance at both ends of the transmitter and receiver-sides.

In general, the magnetic induction method operates according to the standard specification of the Wireless Power Consortium (WPC). According to the WPC standard specification, a wireless power transmitter and a wireless power receiver may communicate with each other. In this case, data communication from the wireless power transmitter to the wireless power receiver employs the Frequency Shift Keying (FSK) scheme while data communication from the wireless power receiver to the wireless power transmitter employs the Amplitude Shift Keying (ASK) scheme.

Data may be transmitted in a control error interval. However, since the time period during which data may be transmitted is limited by the control error interval, the amount of data which may be transferred within a predetermined time period is limited. In addition, although communication from a wireless power transmitter to a wireless power receiver is performed according to the FSK scheme, the FSK scheme has a limitation in transmitting a large amount of data since the FSK scheme exhibits a slow transfer rate by its inherent nature. Moreover, since the length of data packets transmitted at the control error intervals is fixed, if the control error interval becomes shorter than the length of a data packet according to variation of payload due to vibration or impact, it is not possible to send data at the corresponding intervals. Therefore, although wireless charging may involve a process for exchanging a large amount of data between a wireless power transmitter and a wireless power receiver to utilize an additional function such as an authentication procedure in a future, the prior art requires a considerable time to perform the process.

SUMMARY OF THE INVENTION

The technical object of the present disclosure is to provide an apparatus and method for transmitting data in a wireless power transmission system.

Another technical object of the present disclosure is to provide a time interval between control error packets applied to a wireless power transmitter and a wireless power receiver developed based on the standard specification v1.3 of the Wireless Power Consortium (WPC).

Yet another technical object of the present disclosure is to provide a method for exchanging data when two-way communication is performed based on extended power profile (EPP) of the WPC standard; and a time interval between control error packets applied to the wireless power transmitter and wireless power receiver.

Still another technical object of the present disclosure is to provide a wireless power transmitter and a method for the transmitter; and a wireless power receiver and a method for the receiver which improve performance of a data transmission protocol in a new standard of the WPC.

According to one aspect of the present disclosure, a wireless power receiver receiving wireless power from a wireless power transmitter and transmitting a control packet to the wireless power transmitter in a wireless power transfer system is provided. The apparatus comprises a power pick-up unit configured to receive wireless power from the wireless power transmitter via magnetic coupling with the wireless power transmitter and to convert an AC signal generated by the wireless power to a DC signal; a communication/control unit configured to receive the DC signal from the power pick-up unit and to perform control of the wireless power; and a load configured to receive the DC signal from the power pick-up unit.

Here, based on a type of a power profile and a version of wireless power transfer standard with which the wireless power reception and the wireless power transmitter comply, the communication/control unit may be configured to transmit a control error packet including a control error value for the wireless power to the wireless power transmitter in a first time interval or a second time interval larger than the first time interval.

In one aspect, if the version of the wireless power transfer standard is the first version, the communication/control unit may transmit the control error packet in the first time interval while, if the version of the wireless power transfer standard is the second version higher than the first version and the type of the power profile is extended power profile (EPP), the communication/control unit may transmit the control error packet in the second time interval.

In another aspect, if the version of the wireless power transfer standard is the first version, the communication/control unit may transmit the control error packet in the first time interval while, if the version of the wireless power transfer standard is the second version higher than the first version, the type of the power profile is EPP, and transmission of a data packet is needed, the communication/control unit may transmit the control error packet in the second time interval.

In yet another aspect, the wireless power transfer standard may be the Wireless Power Consortium (WPC) specification, the first version may be lower than v1.3, and the second version may be v1.3.

In still another aspect, the first time interval may be larger than the second time interval by two times or more.

In still yet another aspect, according to the type of power profile and the version of wireless power transfer standard with which the wireless power receiver and the wireless power transmitter comply, time-out of the control error packet may be determined as a first time-out or a second time-out larger than the first time-out.

In a still further aspect, if the version of the wireless power transfer standard is the first version, the time-out for the control error packet may be determined as the first time-out while, if the version of the wireless power transfer standard is the second version higher than the first version and type of the power profile is EPP, the time-out for the control error packet may be determined as the second time-out.

In a still yet further aspect, the first time interval may be smaller than the first time-out, and the second time interval may be smaller than the second time-out.

According to another aspect of the present disclosure, a wireless power transmitter transmitting wireless power to a wireless power receiver and receiving a control packet from the wireless power receiver in a wireless power transfer system is provided. The apparatus comprises a power conversion unit configured to transmit wireless power to the wireless power receiver via magnetic coupling with the wireless power receiver; and a communication/control unit configured to receive a control error packet including a control error value for the wireless power from the wireless power receiver in a first time interval or a second time interval larger than the first time interval based on the type of power profile and the version of wireless power transfer standard with which the wireless power receiver and the wireless power transmitter comply.

In one aspect, if the version of the wireless power transfer standard is the first version, the communication/control unit may receive the control error packet in the first time interval while, if the version of the wireless power transfer standard is the second version higher than the first version and the type of the power profile is extended power profile (EPP), the communication/control unit may receive the control error packet in the second time interval.

In another aspect, if the version of the wireless power transfer standard is the first version, the communication/control unit may receive the control error packet in the first time interval while, if the version of the wireless power transfer standard is the second version higher than the first version, the type of the power profile is EPP, and transmission of a data packet is needed, the communication/control unit may receive the control error packet in the second time interval.

In yet another aspect, the wireless power transfer standard may be the Wireless Power Consortium (WPC) specification, the first version may be lower than v1.3, and the second version may be v1.3.

In still another aspect, the first time interval may be larger than the second time interval by two times or more.

In still yet another aspect, according to the type of power profile and the version of wireless power transfer standard with which the wireless power receiver and the wireless power transmitter comply, time-out of the control error packet may be determined as a first time-out or a second time-out larger than the first time-out.

In a still further aspect, if the version of the wireless power transfer standard is the first version, the time-out for the control error packet may be determined as the first time-out while, if the version of the wireless power transfer standard is the second version higher than the first version and the type of the power profile is EPP, the time-out for the control error packet may be determined as the second time-out.

In a still yet further aspect, the first time interval may be smaller than the first time-out, and the second time interval may be smaller than the second time-out.

According to the present disclosure, by adjusting a time interval between control error packets (CEPs) and time-out of the CEP, a large amount of data may be exchanged easily between a wireless power transmitter and a wireless power receiver; a period of time before transmission of wireless power is initiated may be reduced; and an additional function such as an authentication procedure involving exchange of a large amount of data may be provided.

BRIEF DESCRIPTION OF THE DRAWINGS

FIG. 3B illustrates one example of WPC NDEF in a wireless power transmission system.

FIG. 4C illustrates a block diagram of a wireless power transmission system employing BLE communication according to one example.

FIG. 5 is a state transition diagram illustrating a wireless power transfer procedure.

FIG. 10 illustrates a structure of a sync pattern according to one embodiment.

FIG. 12 illustrates a wireless charging certificate format according to one embodiment.

DETAILED DESCRIPTION OF THE EMBODIMENTS

The term "wireless power" used hereinafter refers to energy of arbitrary form related to electric, magnetic, and electromagnetic fields transferred from a wireless power transmitter to a wireless power receiver without using physical electromagnetic conductors. Wireless power may be called a wireless power signal and may refer to the oscillating magnetic flux enclosed by the primary and secondary coils. For example, this document describes power conversion in a system for charging devices including a mobile phone, cordless phone, iPod, MP3 player, and headset wirelessly. In general, the basic principles of wireless power transfer include power transfer through magnetic coupling, power transfer through radio frequency (RF), power transfer through microwaves, and power transfer through ultrasonic waves.

Figure 1:
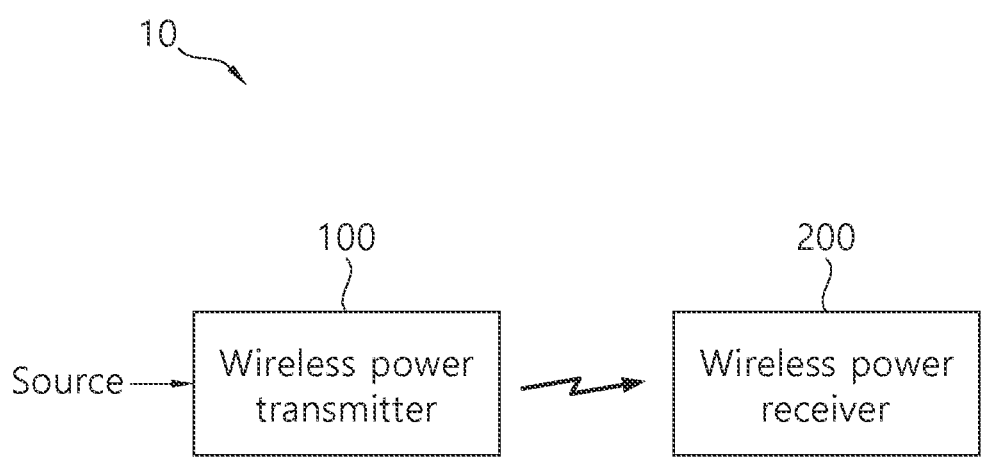
FIG. 1 illustrates a block diagram of a wireless power transmission system 10 according to one embodiment.
Figure 2:
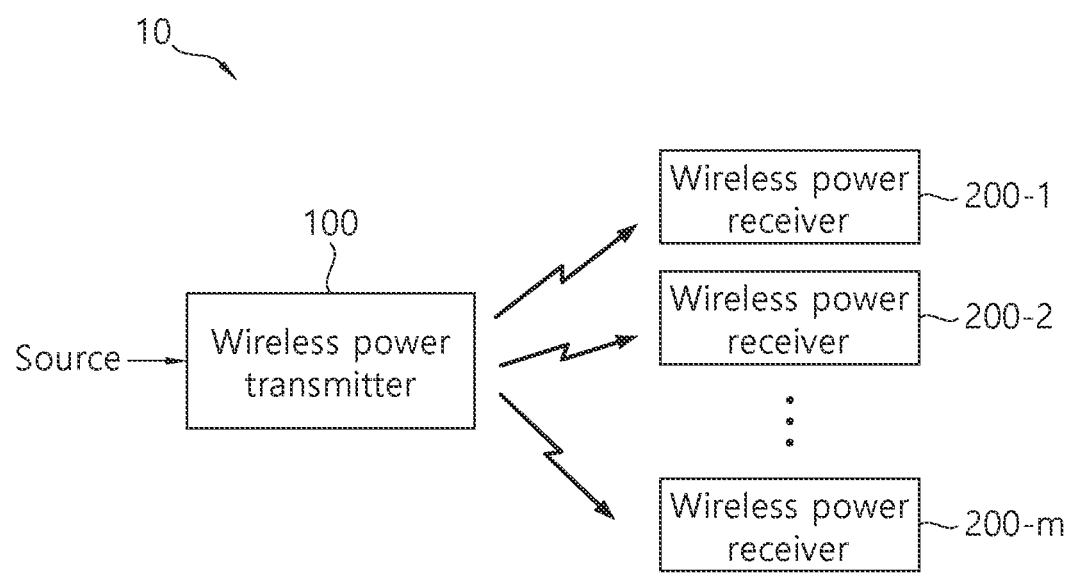
FIG. 2 illustrates a block diagram of a wireless power transmission system 10 according to another embodiment.

FIG. 1 illustrates a block diagram of a wireless power transmission system 10 according to one embodiment, and FIG. 2 illustrates a block diagram of a wireless power transmission system 10 according to another embodiment.

Referring to FIG. 1, the wireless power transmission system 10 includes a wireless power transmitter 100 and a wireless power receiver 200.

The wireless power transmitter 100 receives power from an external power source S and generates a magnetic field. The wireless power receiver 200 receives power wirelessly by generating currents by using the generated magnetic field.

Also, the wireless power transmitter 100 and the wireless power receiver 200 in the wireless power transmission system 10 may transmit and receive various pieces of information required for wireless power transfer. Here, communication between the wireless power transmitter 100 and the wireless power receiver 200 may be performed according to either in-band communication using a magnetic field used for wireless power transfer or out-band communication using a separate communication carrier. Out-band communication may also be called out-of-band communication. In what follows, the terms are unified as out-band communication. Examples of out-band communication include NFC, Bluetooth, and Bluetooth Low Energy (BLE).

Here, the wireless power transmitter 100 may be provided as a fixed or mobile type. Examples of fixed type transmitter include transmitters embedded in the indoor ceiling or wall or furniture such as a table; installed in the form of an implant in an outdoor parking lot, bus stop or subway station; or installed in a transportation means such as a vehicle or a train. The mobile type wireless power transmitter 100 may be implemented as a mobile device with a portable weight or size or as part of another device such as a cover of a notebook computer.

The wireless power receiver 200 should be construed as a comprehensive concept including various types of electronic devices equipped with a battery and various home appliances driven by receiving power wirelessly rather than through a power cable. Typical examples of the wireless power receiver 200 include a portable terminal, cellular phone, smart phone, Personal Digital Assistant (PDA), Portable Media Player (PMP), Wibro terminal, tablet, phablet, notebook, digital camera, navigation terminal, television, and electric vehicle (EV).

In the wireless power transmission system 10, the number of wireless power receiver 200 may be one or plural. Although FIG. 1 illustrates a case where the wireless power transmitter 100 and the wireless power receiver 200 transmit and receive power one-to-one, it is also possible that one wireless power transmitter 100 transmits power to a plurality of wireless power receivers 200-1, 200-2, . . . , 200-M. In particular, when wireless power transmission is conducted through a magnetic resonance scheme, one wireless power transmitter 100 may transmit power to multiple wireless power receivers 200-1, 200-2, . . . , 200-M simultaneously by applying a simultaneous transmission scheme or a time-division transmission scheme.

Also, although FIG. 1 illustrates a case where the wireless power transmitter 100 transmits power directly to the wireless power receiver 200, a separate transceiver such as a relay or repeater for increasing the wireless power transmission range may be introduced between the wireless power transmitter 100 and the wireless power receiver 200. In this case, power is transmitted from the wireless power transmitter 100 to the wireless power transceiver, and the wireless power transceiver again transmits power to the wireless power receiver 200.

In what follows, a wireless power receiver, power receiver, and receiver mentioned in the present specification refer to the wireless power receiver 200. Also, a wireless power transmitter, power transmitter, and transmitter mentioned in the present specification refer to the wireless power transmitter 100.

Figure 3A:
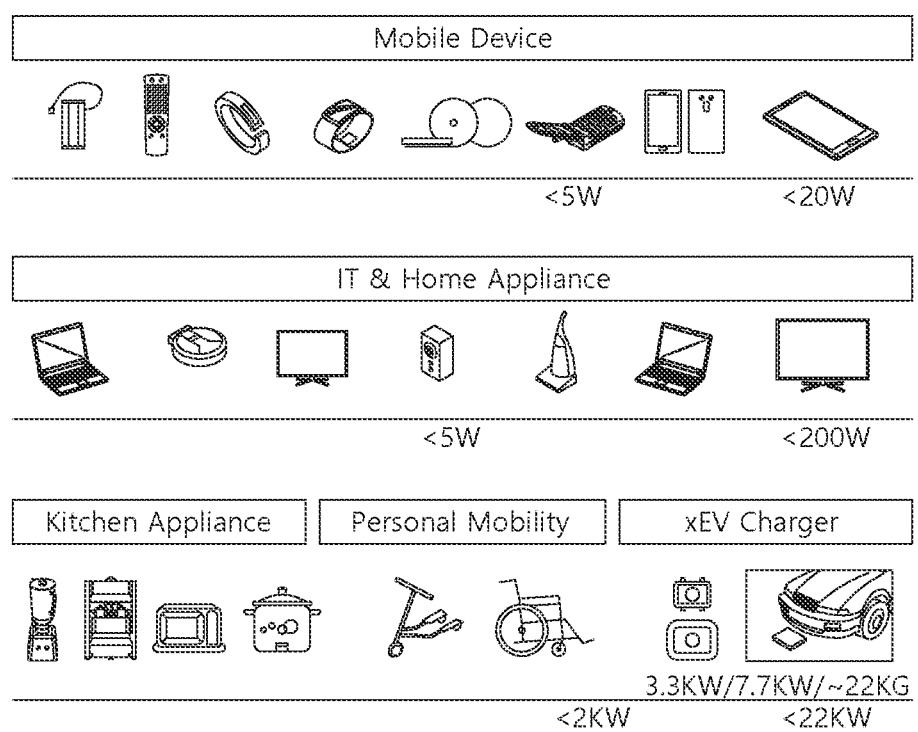
FIG. 3A illustrates examples of various electronic devices where a wireless power transmission system is employed.

FIG. 3A illustrates examples of various electronic devices where a wireless power transmission system is employed, and FIG. 3B illustrates one example of WPC NDEF in a wireless power transmission system.

FIG. 3A illustrates electronic devices categorized according to the amount of power transmitted and received in a wireless power transmission system. Referring to FIG. 3A, a small power (smaller than about 5 W or 20 W) wireless charging scheme may be applied to wearable devices such as a smart watch, smart glasses, Head Mounted Display (HMD), and smart ring; and mobile electronic devices (or portable electronic devices) such as an earphone, remote controller, smart phone, PDA, and tablet PC.

A medium power (smaller than about 50 W or 200 W) wireless charging scheme may be applied to medium-size/small-sized home appliances such as a notebook computer, robot vacuum cleaner, TV, audio device, vacuum cleaner, and monitor. A high power (small than about 2 kW or 22 kW) wireless charging scheme may be applied to kitchen appliances such as a blender, microwave oven, and electric rice cooker; and personal mobility devices (or electric device/mobility means) such as a wheelchair, electric kickboard, electric bicycle, and electric vehicle.

The electronic devices/mobility means described above (or shown in FIG. 1) may each include a wireless power receiver to be described later. Therefore, the aforementioned electronic devices/mobility means may be charged by receiving power wirelessly from a wireless power transmitter.

In what follows, descriptions are given with respect to a mobile device to which a wireless power charging scheme is applied, which is, however, only an example; a wireless charging method according to the present disclosure may be applied to various electronic devices described above.

Standards related to wireless power transmission include those developed by the Wireless Power Consortium (WPC), Air Fuel Alliance (AFA), and Power Matters Alliance (PMA).

WPC standards define baseline power profile (BPP) and extended power profile (EPP). BPP is related to a wireless power transmitter and a wireless power receiver which support 5 W power transmission, and EPP is related to a wireless power transmitter and a wireless power receiver which support transmission of power in the range larger than 5 W and less than 30 W.

Various wireless power transmitters and receivers using different power levels are dealt with by the respective standards and classified into different power classes or categories.

For example, the WPC classifies wireless power transmitters and receivers in terms of power class (PC)-1, PC0, PC1, and PC2; and provides standard specifications for the respective PCs. The PC-1 standard is related to wireless power transmitters and receivers that provide guaranteed power less than 5 W. Applications of the PC-1 include wearable devices such as smart watches.

The PC0 standard is related to wireless power transmitters and receivers providing guaranteed power of 5 W. The PC0 standard includes the EPP in which guaranteed power reaches up to 30 W. Although in-band (IB) communication is a mandatory communication protocol for the PC0 class, out-band (OB) communication, which is used as a backup channel of the option, may also be used. A wireless power receiver may determine whether OB is supported by setting an OB flag within a configuration packet. A wireless power transmitter supporting the OB may enter the OB handover phase by transmitting a bit-pattern for OB handover as a response to the configuration packet. The response to the configuration packet may be NAK, ND, or a newly defined 8-bit pattern. Applications of the PC0 include smart phones.

The PC1 standard is related to wireless power transmitter and receivers providing guaranteed power ranging from 30 W to 150 W. OB is a mandatory communication channel for the PC1 class, and IB is used for initialization and link establishment toward OB. A wireless power transmitter may enter the OB handover phase by transmitting a bit-pattern for OB handover as a response to the configuration packet. Applications of the PC1 include lap-top computers or power tools.

The PC2 standard is related to wireless power transmitter and receivers providing guaranteed power ranging from 200 W to 2 kW, applications of which include kitchen appliances.

As described above, PCs may be distinguished according to the power level, and whether to support compatibility within the same PC may be set as optional or mandatory. Here, compatibility within the same PC indicates that power transmission and reception is possible within the same PC. For example, if a wireless power transmission of PC x is able to charge a wireless power receiver in the same PC x, it may be regarded that compatibility is maintained within the same PC. Similarly to the case above, compatibility between different PCs may also be supported. Here, compatibility between different PCs indicates that power transmission and reception is possible between different PCs. For example, if a wireless power transmitter of PC x is able to charge a wireless power receiver in PC y, it may be regarded that compatibility is maintained between different PCs.

Support of compatibility between PCs is a very important issue from a perspective of user experience and infrastructure development. However, maintaining compatibility between PCs cause various technical problems as follows.

In the case of compatibility within the same PC, for example, a wireless power receiver based on a lap-top charging scheme capable of providing reliable charging only when power is transmitted continuously may run into a problem in receiving power reliably from a wireless power transmitter based on a power tool scheme that transmits power discontinuously. Also, in the case of compatibility between different PCs, for example, when a wireless power transmitter of which the minimum guaranteed power is 200 W transmits power to a wireless power receiver of which the maximum guaranteed power is 5 W, there is a risk that the wireless power receiver is damaged due to overvoltage. As a result, it is difficult to take the PC as an indicator/reference that represents/indicates compatibility.

Wireless power transmitters and receivers may provide very convenient user experience and interface (UX/UI). In other words, a smart wireless charging service may be provided. A smart wireless charging service may be implemented based on the UX/UI of the smart phone including a wireless power transmitter. To implement the application, an interface between the processor of the smart phone and the wireless power receiver allows "drop and play" two-way communication between the wireless power transmitter and receiver.

As one example, a user may experience a smart wireless charging service at a hotel. If the user comes into a hotel room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Welcome to ###hotel. Select "Yes" to activate smart charging functions: Yes | No Thanks". The smart phone receives a user input selecting Yes or No Thanks and performs the next procedure selected by the user. If Yes is selected, the smart phone transmits the corresponding information to the wireless charger. And the smart phone and the wireless charger perform the smart charging function together.

The smart wireless charging service may also include receiving auto-filled WiFi credentials. For example, the wireless charger transmits the WiFi credentials to the smart phone, and the smart phone automatically inputs the WiFi credentials received from the wireless charger by executing an appropriate app.

The smart wireless charging service may also include executing a hotel application that provides a hotel promotion or obtaining remote check-in/check-out and contact information.

As another example, the user may experience the smart wireless charging service inside a vehicle. If the user gets into the vehicle and places a smart phone on a wireless charger, the wireless charger transmits wireless power to the smart phone, and the smart phone receives wireless power. During this process, the wireless charger transmits information about the smart wireless charging service to the smart phone. If the smart phone detects that it is placed on the wireless charger, detects reception of wireless power, or receives information about the smart wireless charging service from the wireless charger, the smart phone enters a state in which it inquires the user about the identity.

In this state, the smart phone is automatically connected to the vehicle via WiFi and/or Bluetooth. the smart phone may display a message on the screen with or without an alarm sound. One example of the message may include sentences such as "Welcome to your car. Select "Yes" to synch device with in-car controls: Yes | No Thanks". The smart phone receives a user input selecting Yes or No Thanks and performs the next procedure selected by the user. If Yes is selected, the smart phone transmits the corresponding information to the wireless charger. And by executing in-vehicle application/display software, the smart phone and wireless charger may perform the in-vehicle smart control function together. The user may enjoy desired music and check a regular map position. The in-vehicle application/display software may include a function that provides synchronized access for passersby.

As yet another example, the user may experience smart wireless charging at home. If the user enters a room and places his or her smart phone on a wireless charger in the room, the wireless charger transmits wireless power to the smart phone, and the smart phone receives wireless power. During this process, the wireless charger transmits, to the smart phone, information about a smart wireless charging service. If the smart phone detects that it is placed on the wireless charger, detects reception of wireless power, or receives information about the smart wireless charging service from the wireless charger, the smart phone enters a state in which it asks the user to opt-in into an additional feature. To this purpose, the smart phone may display a message on the screen with or without an alarm sound. One example of the message may include sentences such as "Hi xxx, Would you like to activate night mode and secure the building?: Yes | No Thanks". The smart phone receives a user input selecting Yes or No Thanks and performs the next procedure selected by the user. If Yes is selected, the smart phone transmits the corresponding information to the wireless charger. The smart phone and the wireless charger may at least recognize the user pattern and recommend the user to lock doors and windows, turn off lights, or set an alarm.

In what follows, 'profile' will be newly defined as an indicator/reference that represents/indicates compatibility. In other words, it may be construed that compatibility is maintained among wireless power transmitters and receivers having the same 'profile' to enable stable power transmission and reception whereas power transmission and reception is impossible among wireless power transmitters and receivers having different 'profiles'. The profile may be defined according to compatibility and/or application regardless of (or independently of) power class.

For example, profiles may be divided largely into four cases: i) mobile, ii) power tool, iii) kitchen, and iv) wearable profile.

In the case of 'mobile' profile, PC may be defined as PC0 and/or PC1; communication protocol/scheme as IB and OB; and operating frequency ranges from 87 kHz to 205 kHz, where examples of application include smart phones and lap-top computers.

In the case of 'power tool' profile, PC may be defined as PC1; communication protocol/scheme as IB; and operating frequency ranges from 87 kHz to 145 kHz, where examples of application include power tools.

In the case of 'kitchen' profile, PC may be defined as PC2; communication protocol/scheme as NFC-based; and operating frequency is less than 100 kHz, where examples of application include kitchen or home appliances.

In the case of power tool and kitchen profiles, NFC communication may be employed between a wireless power transmitter and receiver. By exchanging WPC NFC Data Exchange Profile Format (NDEF), the wireless power transmitter and receiver may confirm that they are NFC devices. For example, as shown in FIG. 3B, the WPC NDEF may include application profile field (for example, IB), version field (for example, IB), and profile specific data (for example, IB). The application profile field indicates whether the corresponding apparatus uses i) mobile and computing, ii) power tool, or iii) kitchen profile; upper nibble of the version field indicates the major version; and lower nibble of the version field indicates the minor version. Also, the profile specific data defines contents for kitchen.

In the case of 'wearable' profile, PC may be defined as PC-1; communication protocol/scheme as IB; and operating frequency ranges from 87 kHz to 205 kHz, where examples of application include wearable devices worn on the user's body.

Maintaining compatibility may be mandatory in the same profile, but optional between different profiles.

The profiles described above (mobile profile, power tool profile, kitchen profile, and wearable profile) may be generalized to first to n-th profiles, and new profiles may be added to/substituted for old profiles according to the WPC specification and embodiments.

In case profiles are defined as described above, a wireless power transmitter may perform power transmission selectively only to the wireless power receiver of the same profile as the wireless power transmitter, thereby enabling more stable power transmission. Also, since the burden on the wireless power transmitter is reduced, and power transmission to incompatible wireless power receivers is not attempted, the risk of damaging a wireless power receiver is reduced.

The PC1 in the 'mobile' profile may be defined by borrowing an optional extension such as OB based on the PC0 while, in the case of 'power tool' profile, it may be defined simply as a modified version of the PC1 'mobile' profile. Also, until now, the wireless transmission technology has been defined in an attempt to maintain compatibility within the same profile; however, in the future, it may be further developed in a direction of maintaining compatibility between different profiles.

The AFA standard refers to a wireless power transmitter as a Power Transmitting Unit (PTU) and refers to a wireless power receiver as a Power Receiving Unit (PRU). PTUs are classified into a plurality of classes as shown in Table 1, and PRUs are classified into a plurality of categories as shown in Table 2.

TABLE 1

|  | $P_{TX\_IN\_MAX}$ | Minimum Category Support Requirements | Minimum Value for Maximum Devices Supported |
| --- | --- | --- | --- |
| Class 1 | 2 W | 1x Category 1 | 1x Category 1 |
| Class 2 | 10 W | 1x Category 3 | 2x Category 2 |
| Class 3 | 16 W | 1x Category 4 | 2x Category 3 |
| Class 4 | 33 W | 1x Category 5 | 3x Category 3 |
| Class 5 | 50 W | 1x Category 6 | 4x Category 3 |
| Class 6 | 70 W | 1x Category 7 | 5x Category 3 |

TABLE 2

| PRU | $P_{RX\_OUT\_MAX}$ | Example Applications |
| --- | --- | --- |
| Category 1 | TBD | Bluetooth headset |
| Category 2 | 3.5 W | Feature phone |
| Category 3 | 6.5 W | Smart phone |
| Category 4 | 13 W | Tablet, Phablet |
| Category 5 | 25 W | Laptop ith a small form factor |
| Category 6 | 37.5 W | Regular laptop |
| Category 7 | 50 W | Home appliance |

Figure 4A:
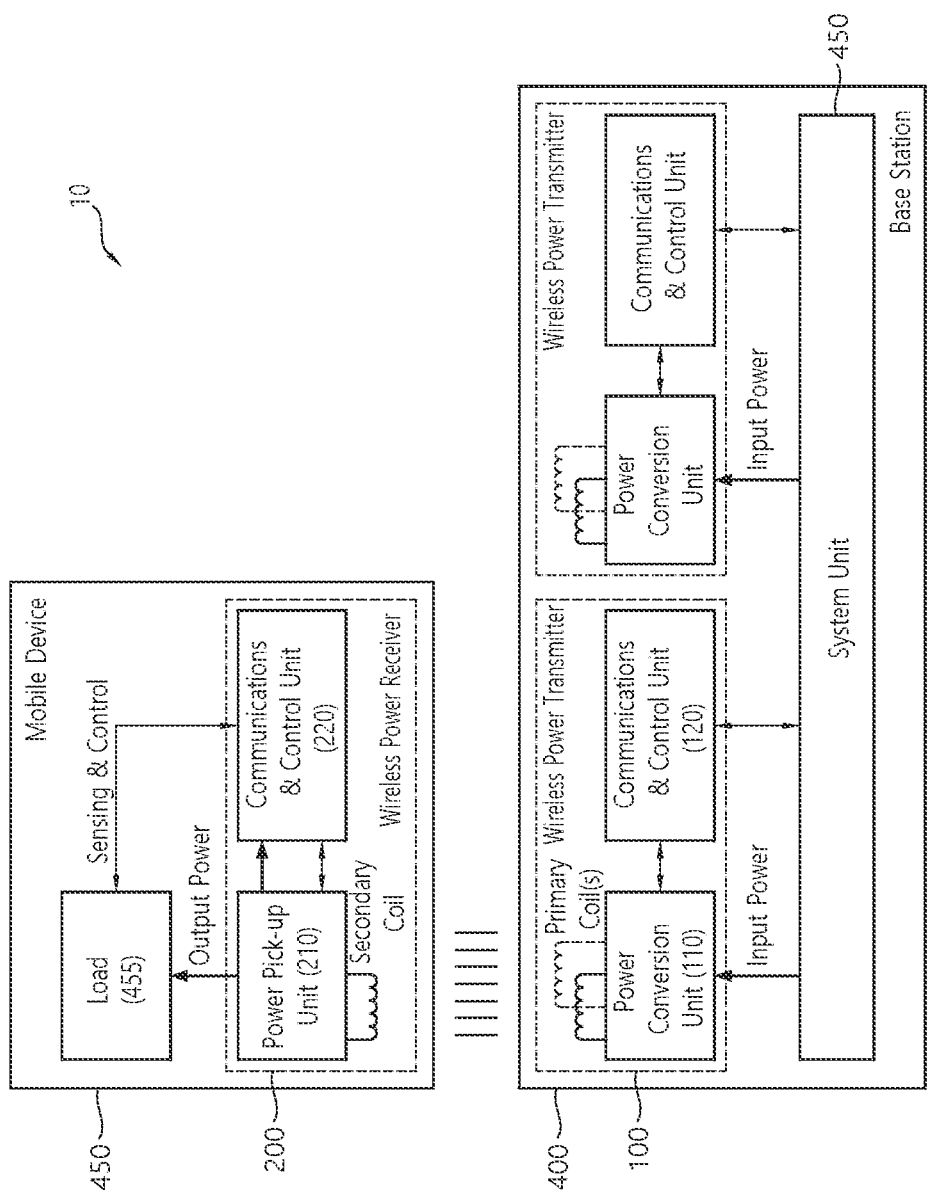
FIG. 4A illustrates a block diagram of a wireless power transmission system according to another embodiment.
Figure 4B:
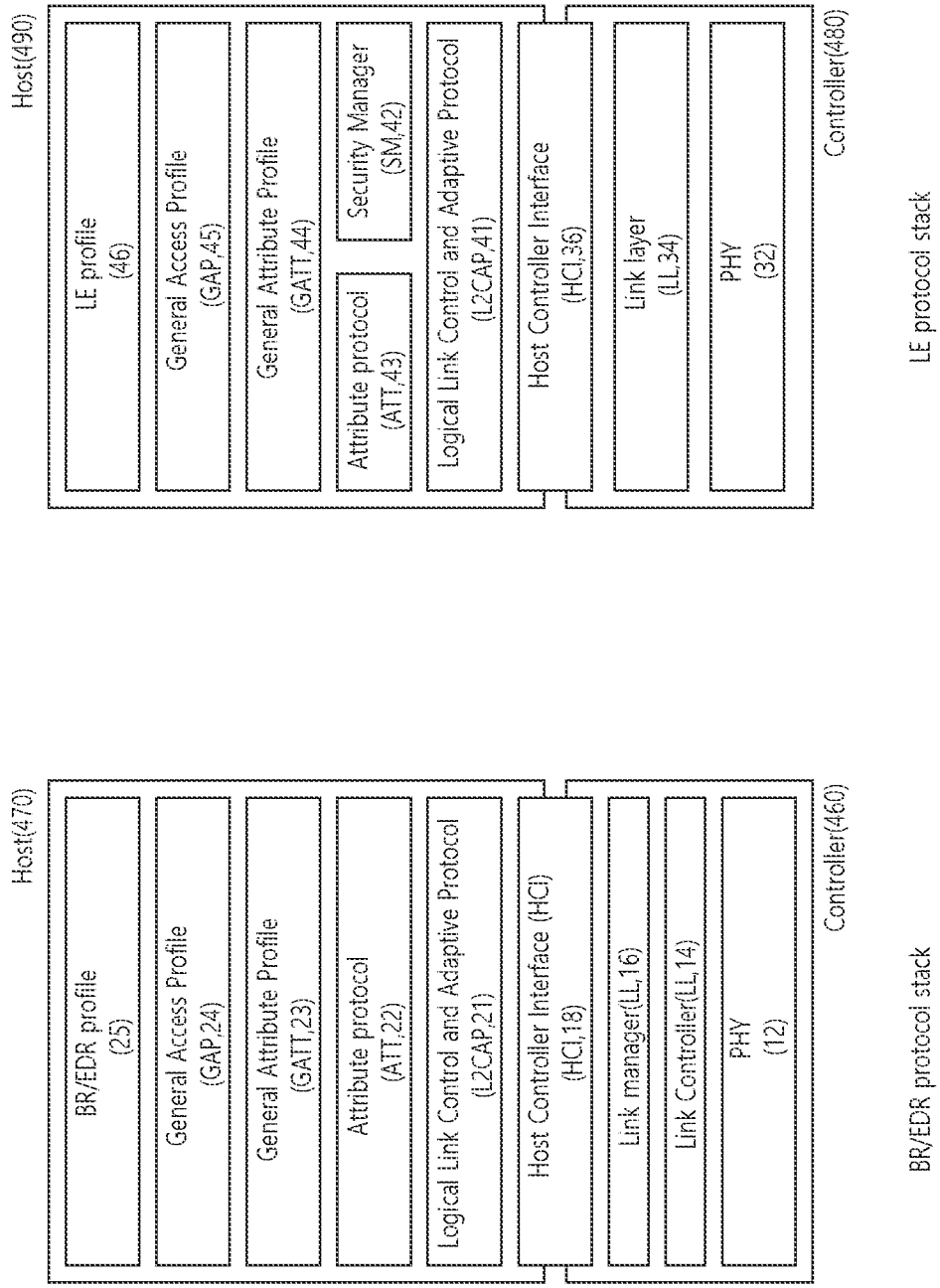
FIG. 4B illustrates one example of Bluetooth communication architecture to which the present disclosure may be applied.

As shown in Table 1, the maximum output power capability of a class n PUT is larger than or equal to the $P_{TX\_IN\_MAX}$ value of the corresponding class. A PRU is not allowed to draw larger power than specified in the corresponding category. FIG. 4A illustrates a block diagram of a wireless power transmission system according to another embodiment. FIG. 4B illustrates one example of Bluetooth communication architecture to which the present disclosure may be applied.

Referring to FIG. 4A, the wireless power transmission system 10 includes a mobile device 450 receiving power wirelessly and a base station 400 transmitting power wirelessly.

The base station 400 provides inductive power or resonant power and may include at least one wireless power transmitter 100 and a system unit 405. The wireless power transmitter 100 may transmit inductive or resonant power and control transmission. The wireless power transmitter 100 may include a power conversion unit 110 that converts electric energy to a power signal by generating a magnetic field through the primary coil(s) and a communication & control unit 120 that controls communication with the wireless power receiver 200 and power transmission so that power may be transmitted at an appropriate level. The system unit 405 may perform control of input power provisioning, control of a plurality of wireless power transmitters, and control of other operation of the base station such as user interface control.

The primary coil may generate an electromagnetic field by using AC power (or voltage or current). The primary coil may receive AC power (or voltage or current) at a particular frequency output from the power conversion unit 110 and generate a magnetic field at the particular frequency. The magnetic field may be generated in a non-radial or radial direction, and the wireless power receiver 200 receive the magnetic field to generate a current. In other words, the primary coil transmits power wirelessly.

In the magnetic induction method, the primary and secondary coils may have arbitrarily suitable shapes; for example, the coils may be realized by copper wires wound around a high permeability member such as ferrite or amorphous metal. The primary coil may also be called primary core, primary winding, or primary loop antenna. Meanwhile, the secondary coil may also be called secondary core, secondary winding, secondary loop antenna, or pickup antenna.

When the magnetic resonance method is used, the primary and secondary coils may be provided in the form of a primary resonant antenna and a secondary resonant antenna. A resonant antenna may have a resonance structure including a coil and a capacitor. At this time, the resonant frequency of the resonant antenna is determined by the inductance of the coil and capacitance of the capacitor. Here, the coil may be formed to have a loop shape. Also, a core may be disposed inside the loop. The core may include a physical core such as a ferrite core or an air core.

Energy transfer between the primary resonant antenna and the secondary resonant antenna may be achieved through the resonance phenomenon of a magnetic field. Resonance is a phenomenon in which high efficiency energy transfer occurs between two resonant antennas when one of the two resonant antennas generates a near field corresponding to the resonant frequency, the other resonant antenna is located in the vicinity of the field generating antenna, and the two resonant antennas are coupled to each other. If a magnetic field corresponding to the resonant frequency is generated between the first and the second resonant antennas, a phenomenon that the first and the second resonant antennas resonate to each other occurs; accordingly, the magnetic field is concentrated towards the secondary resonant antenna with a higher efficiency than a normal case in which the magnetic field generated at the first resonant antenna is radiated into the free space; and thereby energy may be transferred from the first resonant antenna to the secondary resonant antenna with high efficiency. The magnetic induction method may be implemented similarly to how the magnetic resonance method is implemented; however, in this case, the frequency of the magnetic field doesn't have to be the resonant frequency. Instead, in the magnetic induction method, matching is needed between the loops forming the primary and the secondary coils, and spacing between the loops has to be very close.

Although not shown in the figure, the wireless power transmitter 100 may further include a communication antenna. The communication antenna may transmit and receive a communication signal by using a communication carrier in addition to magnetic field communication. For example, the communication antenna may transmit and receive a communication signal based on WiFi, Bluetooth, Bluetooth LE, ZigBee, or NFC.

The communication & control unit 120 may transmit and receive information to and from the wireless power receiver 200. The communication & control unit 120 may include at least one of an IB communication module or OB communication module.

The IB communication module may transmit and receive information by using magnetic waves that use a specific frequency as the center frequency. For example, the communication & control unit 120 may perform in-band communication by loading information on magnetic waves and transmitting the magnetic waves through the primary coil or receive magnetic waves carrying information through the primary coil. At this time, by using modulation methods like Binary Phase Shift Keying (BPSK) or Amplitude Shift Keying (ASK) scheme or coding methods like Manchester coding or non-return-to-zero level (NZR-L) coding, information may be loaded into magnetic waves or magnetic waves carrying information may be interpreted. By using the IB communication, the communication & control unit 120 may transmit and receive information up to several meters at a data rate of several kbps.

The OB communication module may perform out-band communication through the communication antenna. For example, the communication & control unit 120 may be provided as a short-range communication module. Examples of a short-range communication module include communication modules based on Wi-Fi, Bluetooth, Bluetooth LE, ZigBee, and NFC.

The communication & control unit 120 may control the overall operation of the wireless power transmitter 100. The communication & control unit 120 may perform computation and processing of various pieces of information and control each constituting element of the wireless power transmitter 100.

The communication & control unit 120 may be implemented by a computer or a device similar to the computer by using hardware, software, or a combination thereof. In hardware, the communication & control unit 120 may be provided in the form of an electronic circuit that processes electric signals and performs control functions. In software, the communication & control unit 120 may be provided in the form of a program that drives the hardware for the communication & control unit 120.

The communication & control unit 120 may control transmission power by controlling an operating point. The operating point to be controlled may correspond to a combination of a frequency (or phase), duty cycle, duty ratio, and voltage amplitude. The communication & control unit 120 may control transmission power by adjusting at least one of the frequency (or phase), duty cycle, duty ratio, and voltage amplitude. Also, the wireless power receiver 200 may control reception power by controlling the resonant frequency while the transmitter 100 supplies constant power.

The mobile device 450 includes a wireless power receiver 200 that receives wireless power through the secondary coil and a load 455 that receives and stores the power received by the wireless power receiver 200 and supplies the stored power to a device.

The wireless power receiver 200 may include a power pick-up unit 210 and communication & control unit 220. The power pick-up unit 210 may receive wireless power through the secondary coil and convert the received wireless power to electric energy. The power pick-up unit 210 rectifies an AC signal obtained through the secondary coil to convert to a DC signal. The communication & control unit 220 may control transmission and reception of wireless power (power transmission and reception).

The secondary coil may receive wireless power transmitted from the wireless power transmitter 100. The secondary coil may receive power by using a magnetic field generated at the primary coil. Here, in case a particular frequency is the resonant frequency, magnetic resonance is generated between the primary and secondary coils, and the secondary coil may receive power more efficiently.

Although not shown in FIG. 4A, the communication & control unit 220 may further include a communication antenna. The communication antenna may transmit and receive a communication signal by using a communication carrier in addition to magnetic field communication. For example, the communication antenna may transmit and receive a communication signal based on WiFi, Bluetooth, Bluetooth LE, ZigBee, or NFC.

The communication & control unit 220 may transmit and receive information to and from the wireless power receiver 100. The communication & control unit 220 may include at least one of an IB communication module or OB communication module.

The IB communication module may transmit and receive information by using magnetic waves that use a specific frequency as the center frequency. For example, the communication & control unit 220 may perform in-band communication by loading information on magnetic waves and transmitting the magnetic waves through the secondary coil or receive magnetic waves carrying information through the secondary coil. At this time, by using modulation methods like Binary Phase Shift Keying (BPSK) or Amplitude Shift Keying (ASK) scheme or coding methods like Manchester coding or non-return-to-zero level (NZR-L) coding, information may be loaded into magnetic waves or magnetic waves carrying information may be interpreted. By using the IB communication, the communication & control unit 220 may transmit and receive information up to several meters at a data rate of several kbps.

The OB communication module may perform out-band communication through the communication antenna. For example, the communication & control unit 220 may be provided as a short-range communication module.

Examples of a short-range communication module include communication modules based on Wi-Fi, Bluetooth, Bluetooth LE, ZigBee, and NFC.

The communication & control unit 220 may control the overall operation of the wireless power receiver 200. The communication & control unit 220 may perform computation and processing of various pieces of information and control each constituting element of the wireless power receiver 200.

The communication & control unit 220 may be implemented by a computer or a device similar to the computer by using hardware, software, or a combination thereof. In hardware, the communication & control unit 220 may be provided in the form of an electronic circuit that processes electric signals and performs control functions. In software, the communication & control unit 120 may be provided in the form of a program that drives the hardware for the communication & control unit 220.

When the communication & control unit 120 and the communication & control unit 220 employ Bluetooth or Bluetooth LE as an OB communication module or short-range communication module, the communication & control unit 120 and the communication & control unit 220 may operate by implementing the communication architecture as shown in FIG. 4B.

FIG. 4B shows one example of a protocol stack of the Bluetooth Basic Rate (BR)/Enhanced Data Rate (EDR) that supports GATT and one example of a protocol stack of Bluetooth Low Energy (LE).

More specifically, the Bluetooth BR/EDR protocol stack may include an controller stack 460 and a host stack 470 with respect to a host controller interface (HCI) 18.

The host stack (or host module) 470 refers to hardware for transmitting or receiving a Bluetooth packet to and from a wireless transceiver module receiving a Bluetooth signal of 2.4 GHz. The controller stack 460 is connected to a Bluetooth module and controls the Bluetooth module and performs an operation.

The controller stack 460 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls the overall operation (link setup, control, security) of a Bluetooth connection by utilizing a link manager protocol (LMP).

The link manager layer 16 may perform the following functions.

The link manager layer 16 may perform ACL/SCO logical transport, logical link setup, and control.

Detach: The link manager layer 16 stops connection and informs a counterpart device about the reason for stopping connection.

The link manager layer 16 performs power control and role switch.

The link manager layer 16 performs a security (authentication, pairing, and encryption) function.

The host controller interface layer 18 provides an interface between the host module and the controller module to allow the host to provide a command and data to the controller and allow the controller to provide an event and data to the host.

The host stack (or host module) 470 includes a logical link control and adaptive protocol (L2CAP) 21, attribute protocol (ATT) 22, generic attribute profile (GATT) 23, generic access profile (GAP) 24, and BR/EDR profile 25.

The logical link control and adaptive protocol (L2CAP) 21 may provide a two-way channel for transmitting data to a specific protocol or a profile.

The L2CAP 21 may multiplex various protocols and profiles provided from a Bluetooth higher position.

The L2CAP of the Bluetooth BR/EDR uses a dynamic channel; supports a protocol service multiplexer, retransmission, and a streaming mode; and provides segmentation and reassembly, per-channel flow control, and error control.

The generic attribute profile (GATT) 23 may operate as a protocol describing how the attribute protocol 22 is used in configuring services. For example, the generic attribute profile 23 may operate to specify how ATT attributes are grouped together into services and operate to describe features associated with services.

Thus, the GATT 23 and the ATT 22 may use features in order to describe status and services of a device and describe how the features are related to each other and how the features used.

The attribute protocol 22 and the BR/EDR profile 25 define a service (profile) using the Bluetooth BR/EDR and define an application protocol for exchanging data; and the generic access profile (GAP) 24 defines device discovery, connection and security level.

Next, the Bluetooth LE protocol stack includes a controller stack 480 that may be operated to process a wireless device interface for which timing is important, and a host stack 490 that may be operated to process high level data.

First, the controller stack 480 may be implemented by using a communication module that may include a Bluetooth wireless device, for example, a processor module that may include a processing device such as a microprocessor.

The host stack 490 may be implemented as part of an OS operated on the processor module or may be implemented as instantiation of a package on the OS.

In some examples, the controller stack and the host stack may be operated or executed on the same processing device within the processor module.

The controller stack 480 includes a physical layer (PHY) 32, link layer (LL) 34, and host controller interface (HCI) 36.

The physical layer (PHY) (wireless transceiver module) 32 is a layer for transmitting and receiving a 2.4 GHz wireless signal and uses Gaussian frequency shift keying (GFSK) modulation and a frequency hopping technique including 40 RF channels.

The link layer (LL) 34 serving to transmit or receive a Bluetooth packet provides a function of generating a connection between devices after performing an advertising and scanning function using three advertising channels, and exchanging data packets of a maximum of 257 bytes through 37 data channels.

The host stack 490 may include a logical link control and adaptation protocol (L2CAP) 41, security manager (SM) 42, attribute protocol (ATT) 43, generic attribute profile (GATT) 44, generic attribute profile (GAP) 45, and an LE profile 46. However, the host stack 490 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage multicast data transmission.

In the Bluetooth LE, three fixed channels (one for a signaling channel, one for a security manager, and one for an attribute protocol) are basically used, and a dynamic channel may be used if necessary.

Meanwhile, in the BR/EDR, a dynamic channel is used by default, and a protocol service multiplexer, retransmission, streaming mode, and the like, are supported.

The SM 42 is a protocol for authenticating a device and providing a key distribution.

The ATT 43 defines a rule for accessing data of a counterpart device in a server-client structure. The ATT 43 includes six types of messages (request, response, command, notification, indication, and confirmation) as follows.

1) Request and Response message: A request message is a message for a client device to request specific information from a server device, and the response message, which is a response message with respect to the request message, refers to a message that may be used for transmission from the server device to the client device.

2) Command message: It is a message transmitted from the client device to the server device mainly to indicate a command of a specific operation. The server device does not transmit a response with respect to the command message to the client device.

3) Notification message: It is a message transmitted from the server device to the client device in order to notify of an event or the like. The client device does not transmit a confirm message with respect to the notification message to the server device.

4) Indication and confirm message: It is a message transmitted from the server device to the client device in order to notify of an event or the like. Unlike the notification message, the client device transmits a confirm message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, which is a layer newly implemented for the Bluetooth LE technology, is used to select a role for communication between Bluetooth LE devices and to control how a multi-profile operation takes place.

Also, the generic access profile (GAP) 45 is mainly used for device discovery, connection generation, and security procedure; defines a scheme for providing information to a user; and defines attribute types as follows.

1) Service: It defines a basic operation of a device by using a combination of behaviors related to data 2) Include: It defines a relationship between services 3) Characteristics: It is a data value used in a service 4) Behavior: It is a format that may be read by a computer defined by a UUID (value type).

The LE profile 46, including profiles dependent upon the GATT, is mainly applied to Bluetooth LE devices. The LE profile 46 may include, for example, Battery, Time, FindMe, Proximity, Time, and the like, and details of the GATT-based profiles are as follows.

1) Battery: Battery information exchanging method

2) Time: Time information exchanging method

3) FindMe: Provision of alarm service according to distance

4) Proximity: Battery information exchanging method

5) Time: Time information exchanging method

The generic attribute profile (GATT) 44 may operate as a protocol describing how the attribute protocol (ATT) 43 is used when services are configured. For example, the GATT 44 may operate to define how ATT attributes are grouped together into services and operate to describe features associated with services.

Thus, the GATT 44 and the ATT 43 may use features in order to describe status and services of a device and describe how the features are related to each other and used.

Hereinafter, procedures of the Bluetooth low energy (BLE) technology will be briefly described.

The BLE procedure may be classified as a device filtering procedure, advertising procedure, scanning procedure, discovering procedure, and connecting procedure.

Device Filtering Procedure

The device filtering procedure is a method for reducing the number of devices making a response to a request, indication, notification, and the like in the controller stack. When requests are received from all the devices, it is not necessary to respond to the requests. Therefore, the controller stack may perform control to reduce the number of transmitted requests so that power consumption is reduced in the BLE controller.

An advertising device or scanning device may perform the device filtering procedure to limit the number of devices receiving an advertising packet, scan request or connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, if the scanning device receives some advertising packets from the advertising device, the scanning device has to transmit a scan request to the advertising device.

However, if a device filtering procedure is used and obviates scan request transmission, the scanning device may disregard the advertising packets transmitted from the advertising device.

Even in a connection request process, the device filtering procedure may be used. If device filtering is used in the connection request process, it becomes unnecessary to transmit a response to the connection request by disregarding the connection request.

Advertising Procedure

The advertising device performs an advertising procedure to perform undirected broadcast to devices within a region.

Here, the undirected broadcast is advertising toward all the devices rather than broadcast toward a specific device, and all the devices may scan advertising to make an additional information request or a connection request.

In contrast to the undirected broadcast, in the directed broadcast, only the device designated as a reception device may make an additional information request or a connection request by scanning advertising.

The advertising procedure is used to establish a Bluetooth connection with a nearby initiating device.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising device transmits a response to the scan request to the device which has transmitted the scan request through the same advertising physical channel in which the scan request has been received.

Broadcast user data sent as part of advertising packets are dynamic data while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may restart advertising after the connected mode.

Scanning Procedure

A device performing scanning, that is, a scanning device performs a scanning procedure to listen to undirected broadcast of user data from advertising devices using an advertising physical channel.

The scanning device transmits a scan request to an advertising device through an advertising physical channel in order to request additional data from the advertising device. The advertising device transmits a scan response in response to the scan request by including therein additional user data which has been requested by the scanning device through the advertising physical channel.

The scanning procedure may be used while being connected to other BLE device in the BLE piconet.

If the scanning device is in an initiator mode in which the scanning device may receive an advertising event and initiate a connection request, the scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

A device available for Bluetooth communication (hereinafter, referred to as "Bluetooth device") performs an advertising procedure and a scanning procedure to discover devices in the vicinity thereof or to be discovered by other devices within a given area.

The discovering procedure is performed asymmetrically. A Bluetooth device attempting to discover other nearby device is termed a discovering device and listens to discover devices advertising an advertising event that may be scanned. A Bluetooth device which may be discovered and used by other device is termed a discoverable device and actively broadcasts an advertising event so that it may be scanned by other device through an advertising (broadcast) physical channel.

Both the discovering device and the discoverable device may have already been connected with other Bluetooth devices in a piconet.

Connecting Procedure

A connecting procedure is asymmetrical and requests that, while a specific Bluetooth device is performing an advertising procedure, other Bluetooth devices should perform a scanning procedure.

In other words, an advertising procedure may become the goal, and as a result, only one device may respond to the advertising. After a connectable advertising event is received from an advertising device, a connecting request may be transmitted to the advertising device through an advertising (broadcast) physical channel to initiate connection.

Hereinafter, operational states in the BLE technology, that is, an advertising state, scanning state, initiating state, and connection state will be briefly described.

Advertising State

A link layer (LL) enters an advertising state according to an instruction from a host (stack). If the LL is in the advertising state, the LL transmits an advertising packet data unit (PDU) from advertising events.

Each of the advertising events include at least one advertising PDU, and the advertising PDUs are transmitted through an advertising channel indexes in use. After the advertising PDU is transmitted through an advertising channel index in use, the advertising event may be terminated, or if the advertising device needs to secure a space for performing other function, the advertising event may be terminated earlier.

Scanning State

The LL enters the scanning state according to an instruction from the host (stack). In the scanning state, the LL listens to advertising channel indexes.

The scanning state includes two types: passive scanning and active scanning. Each of the scanning types is determined by the host.

A separate time period for performing scanning or an advertising channel index is not defined.

During the scanning state, the LL listens to an advertising channel index in a scan window (scanWindow) duration. A scan interval (scanInterval) is defined as an interval between start points of two contiguous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and is unable to transmit any packet.

In the active scanning, the LL performs listening in order to rely on an advertising PDU type capable of requesting additional information related to advertising PDUs and an advertising device from the advertising device.

Initiating State

The LL enters the initiating state according to an instruction from the host (stack).

When the LL is in the initiating state, the LL performs listening to advertising channel indexes.

In the initiating state, the LL listens to an advertising channel index during the scan window interval.

Connection State

When a device performing a connection request, that is, an initiating device transmits a CONNECT_REQ PDU to an advertising device or when the advertising device receives a CONNECT_REQ PDU from the initiating device, the LL enters a connection state.

It is considered that a connection is generated after the LL enters the connection state. However, it is not necessary that the connection should be established at the time the LL enters the connection state. The only difference between a newly generated connection and a pre-established connection is an LL connection supervision timeout value.

When two devices are connected, the two devices play different roles.

An LL serving as a master is termed a master, and an LL serving as a slave is termed a slave. The master adjusts timing of a connection event, and the connection event refers to a time point at which the master and the slave are synchronized to each other.

Hereinafter, packets defined in the Bluetooth interface will be briefly described. BLE devices use packets as defined below.

Packet Format

The LL has only one packet format used for both of an advertising channel packet and a data channel packet.

Each packet includes four fields of a preamble, an access address, a PDU, and a CRC.

When one packet is transmitted in an advertising channel, the PDU may become an advertising channel PDU, and when one packet is transmitted in a data channel, the PDU may become a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
| --- | --- |
| 0000 | ADV_IND |
| 0001 | ADV_DIRECT_IND |
| 0010 | ADV_NONDIRECT_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in the advertising state and received by the LL in the scanning state or in the initiating state.

Scanning PDU

The following advertising channel DPU types are termed scanning PDUs and are used in a state described below.

SCAN_REQ: Transmitted by the LL in the scanning state and received by the LL in the advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may have a 16-bit header and payload having various sizes and may include a message integrity check (MIC) field.

The procedures, states, and packet formats in the BLE technology described above may be applied to perform the methods proposed in the present specification.

Referring again to FIG. 4A, the load 455 may be a battery. A battery may store energy by using power output from the power pick-up unit 210. Meanwhile, a battery does not necessarily need to be included in the mobile device 450. For example, a battery may be provided as an external entity in a removable form. In another example, instead of the battery, the wireless power receiver 200 may have a driving means to drive various operations of an electronic device.

Although the figure illustrates a case where the mobile device 450 includes the wireless power receiver 200, and the base station 400 includes the wireless power transmitter 100, the wireless power receiver 200 may be considered to be the same as the mobile device 450, and the wireless power transmitter 100 may be considered to be the same as the base station 400 in a broad sense.

If the communication & control unit 120 and the communication & control unit 220 include a Bluetooth or Bluetooth LE module as an OB communication module or short-range communication module in addition to an IB communication module, the wireless power transmitter 100 including the communication & control unit 120 and the wireless power receiver 200 including the communication & control unit 220 may be expressed by a simplified block diagram as shown in FIG. 4C.

Figure 4D:
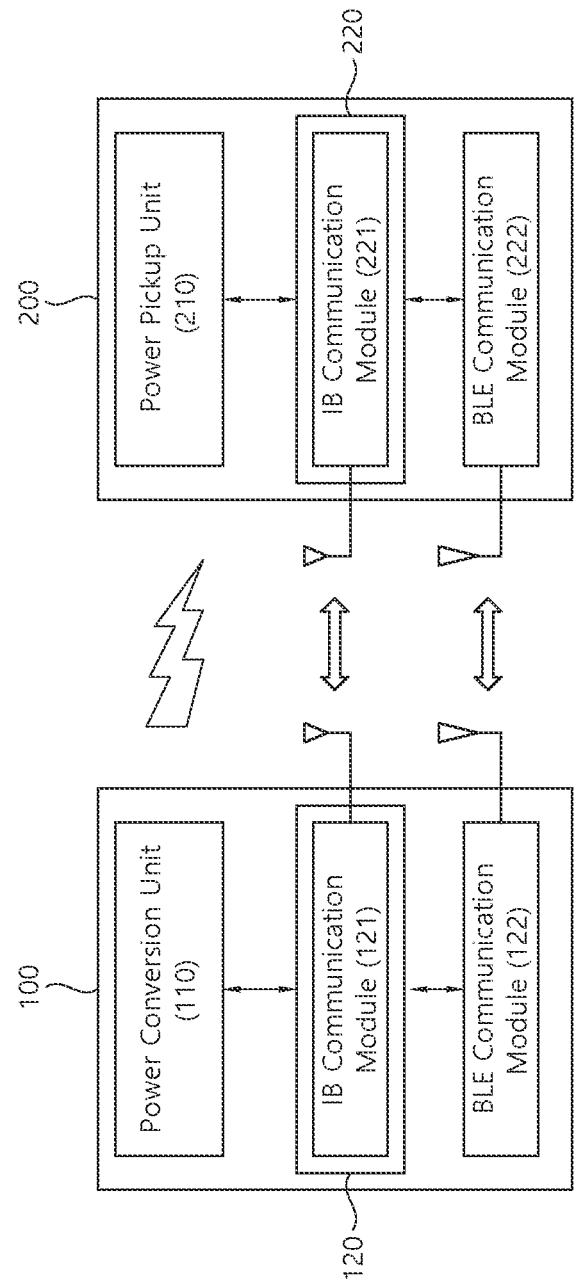
FIG. 4D illustrates a block diagram of a wireless power transmission system employing BLE communication according to another example.

FIG. 4C illustrates a block diagram of a wireless power transmission system employing BLE communication according to one example, and FIG. 4D illustrates a block diagram of a wireless power transmission system employing BLE communication according to another example.

Referring to FIG. 4C, the wireless power transmitter 100 includes a power conversion unit 110 and a communication & control unit 120. The communication & control unit includes an in-band communication module 121 and a BLE communication module 122.

Meanwhile, the wireless power receiver 200 includes a power pickup unit 210 and a communication & control unit 220. The communication & control unit 220 includes an in-band communication module 221 and a BLE communication module 222.

In one aspect, the BLE communication modules 122, 222 adopt the architecture and perform operation according as shown in FIG. 4B. For example, the BLE communication modules 122, 222 may be used to establish access between the wireless power transmitter 100 and the wireless power receiver 200 and to exchange control information and packets required for wireless power transmission.

In another aspect, the communication & control unit 120 may be configured to operate a profile for wireless charging. Here, a profile for wireless charging may be the GATT using BLE transmission.

Meanwhile, the communication & control units 120, 220 may also be implemented in a way that each of the communication & control units includes only the in-band communication module 121, 221 and the BLE communication modules 122, 222 are installed separately from the communication & control units 120, 220.

In what follows, a coil or a coil unit may refer to a coil assembly, coil cell, or cell including a coil and at least one element adjacent to the coil.

In what follows, a coil or a coil unit may refer to a coil assembly, coil cell, or cell including a coil and at least one element adjacent to the coil.

FIG. 5 is a state transition diagram illustrating a wireless power transfer procedure.

Referring to FIG. 5, power transmission from a wireless power transmitter to a wireless power receiver according to one embodiment of the present disclosure may be largely divided into a selection phase 510, ping phase 520, identification and configuration phase 530, negotiation phase 540, calibration phase 550, power transfer phase 560, and renegotiation phase 570.

The selection phase 510 may be a phase to which the current phase—for example, it may correspond to S501, S502, S504, S508, S510, and S512—transitions when power transmission is started or a specific error or a specific event is detected while power transmission is maintained. Here, the specific error or specific event will be made clear from the following description. In addition, in the selection phase 510, the wireless power transmitter may monitor whether an object is present on an interface surface. Upon detecting that the object is present on the interface surface, wireless power transmission transitions to the ping phase 520. In the selection phase 510, the wireless power transmitter may transmit an analog ping signal with a very short pulse and may detect whether an object is present in an activate area of the interface surface based on a current change in the transmission coil or primary coil.

If an object is detected in the selection phase 510, the wireless power transmitter may measure a quality factor of a wireless power resonant circuit (for example, power transmission coil and/or resonant capacitor). In one embodiment of the present disclosure, if an object is detected in the selection phase 510, the quality factor may be measured to determine whether a wireless power receiver is placed in the charging area together with a foreign object. In the case of a coil used for the wireless power transmitter, inductance and/or series resistance component of the coil may be reduced due to environmental change, which accordingly reduces the quality factor. To determine existence of a foreign object by using the measured quality factor, the wireless power transmitter may receive, from the wireless power receiver, a reference quality factor value measured in advance when no foreign object is placed within the charging area. In the negotiation phase 540, the received reference quality factor value is compared with a measured quality factor value to determine existence of a foreign object. However, in the case of a wireless power receiver where the reference quality factor value is low—for example, a specific wireless power receiver may have a low reference quality factor value according to the type, intended use, and characteristics of the specific wireless power receiver—there may not be a significant difference between the measured quality factor and the reference quality factor even in the presence of a foreign object, which may cause a problem in determining existence of the foreign object. Therefore, existence of a foreign object has to be determined by taking into account other decisive factor or by using other method.

In another embodiment of the present disclosure, if an object is detected in the selection phase 510, a quality factor within a specific frequency range (for example, the operating frequency range) may be measured to determine whether the wireless power receiver has been disposed together with a foreign object in the charging area. In the case of a coil used for the wireless power transmitter, inductance and/or series resistance component of the coil may be reduced due to environmental change, which may accordingly change (shift) the resonant frequency of the coil of the wireless power transmitter. In other words, the quality factor peak frequency, which is the frequency at which the maximum quality factor value is measured within the operating frequency range, may be moved.

In the ping phase 520, upon detecting an object, the wireless power transmitter may wake up the wireless power receiver and may transmit a digital ping for determining whether the detected object is the wireless power receiver. In the ping phase 520, if the wireless power transmitter does not receive a response signal to the digital ping, for example, a signal strength packet, from the wireless power receiver, the ping phase 620 may re-transition to the selection phase 510. Also, in the ping phase 520, upon receiving a signal indicating that power transmission is completed, namely, a charging complete packet, from the wireless power receiver, the wireless power transmitter may transition to the selection phase 510.

When the ping phase 520 is completed, the wireless power transmitter may transition to the identification and configuration phase 530 for identifying a wireless power receiver and collecting configuration and status information of the wireless power receiver.

In the identification and configuration phase 530, if an unexpected packet is received, an expected packet is not received for a predetermined period of time (time out), a transmission error occurs, or no power transfer contact is set, the wireless power transmitter may transition to the selection phase 510.

The wireless power transmitter may check whether transition to the negotiation phase 540 is needed based on a negotiation field value of a configuration packet received in the identification and configuration phase 530. If it is turned out from the checking result that a negotiation is needed, the wireless power transmitter may enter the negotiation phase 540 and perform a predetermined Foreign Object Detection (FOD) procedure. On the other hand, if it is found from the checking result that a negotiation is not needed, the wireless power transmitter may immediately transition to the power transfer phase 560.

In the negotiation phase 540, the wireless power transmitter may receive a Foreign Object Detection (FOD) status packet including a reference quality factor value. Or, the wireless power transmitter may receive an FOD status packet including a reference peak frequency value. Or, the wireless power transmitter may receive a status packet including a reference quality factor value and a reference peak frequency value. At this time, the wireless power transmitter may determine a quality coefficient threshold for FOD based on the reference quality factor value. The wireless power transmitter may determine the peak frequency threshold for FOD based on the reference peak frequency value.

The wireless power transmitter may detect whether a foreign object exists in a charging area by using a quality coefficient threshold for the determined FOD and a currently measured quality factor value (a quality factor value measured before the ping phase) and may control power transmission according to the FOD result. As one example, if an FO is detected, power transmission may be stopped, but the present disclosure is not limited to the specific case.

The wireless power transmitter may detect existence of an FO in a charging area by using the peak frequency threshold for a determined FOD and a currently measured peak frequency value (a peak frequency value measured before the ping phase) and may control power transmission according to the FOD result. As one example, if an FO is detected, power transmission may be stopped, but the present disclosure is not limited to the specific case.

If an FO is detected, the wireless power transmitter may return to the selection phase 510. On the other hand, if an FO is not detected, the wireless power transmitter may enter the power transfer phase 560 via the calibration phase 550. More specifically, if an FO is not detected, the wireless power transmitter may determine strength of power received by the wireless power receiver in the calibration phase 550 and measure power loss at the wireless power transmitter and receiver to determine the strength of power transmitted by the wireless power transmitter. In other words, the wireless power transmitter may predict power loss based on a difference between transmission power at the wireless power transmitter and reception power at the wireless power receiver in the calibration phase 550. The wireless power transmitter according to one embodiment may calibrate the threshold for FOD by taking into account the predicted power loss.

In the power transfer phase 560, if an unexpected packet is received, an expected packet is not received for a predetermined period of time (time out), preset power transfer contract violation occurs, or charging is completed, the wireless power transmitter may transition to the selection phase 510.

Also, in the power transfer phase 560, if a power transfer contract needs to be reconfigured depending on a state change of the wireless power transmitter, the wireless power transmitter may transition to the renegotiation phase 570. At this time, if renegotiation is completed normally, the wireless power transmitter may return to the power transfer phase 560.

The power transfer contract may be set based on state and characteristics information of the wireless power transmitter and receiver. For example, the state information of the wireless power transmitter may include information about a maximum transmissible power amount, information about the maximum number of wireless power receivers that may be accommodated, and so on and the state information of the wireless power receiver may include information about required power and so on.

Figure 6:
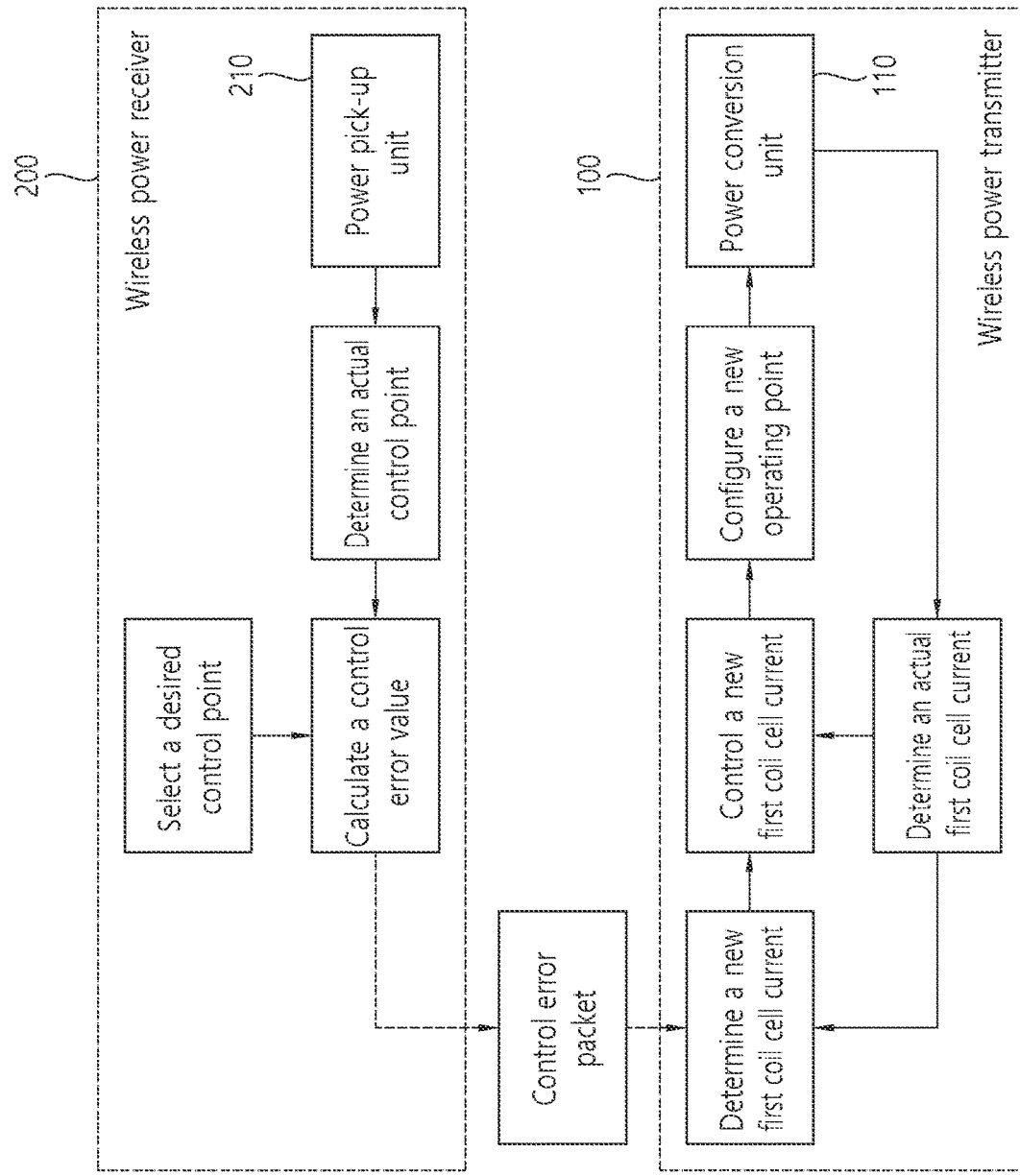
FIG. 6 illustrates a power control method according to one embodiment.

FIG. 6 illustrates a power control method according to one embodiment.

Referring to FIG. 6, in the power transfer phase, the wireless power transmitter 100 and the wireless power receiver 200 may control the amount of power transferred by performing power transfer and communication at the same time. The wireless power transmitter and the wireless power receiver operate at a specific control point. The control point represents a combination of voltage and current provided at the output of the wireless power receiver when power transfer is performed.

To describe in more detail, the wireless power receiver selects a desired control point—desired output current/voltage, temperature at a specific position on a mobile device, and so on—and additionally determines an actual control point currently operating. The wireless power receiver may calculate a control error value by using the desired control point and the actual control point and transmit the calculated control error value to the wireless power transmitted through a control error packet.

And the wireless power transmitter may configure/control a new operating point—amplitude, frequency, and duty cycle—and control power transfer by using the received control error packet. Therefore, the control error packet is transmitted/received at regular time intervals in the power transfer phase, and as an embodiment, if the wireless power receiver attempts to reduce the current of the wireless power transmitter, the wireless power receiver may transmit the control error value by setting the control error value to a negative value while, if the wireless power receiver attempts to increase the current, the control error value may be transmitted after being set to a positive value. In this way, in the induction mode, the wireless power receiver may control power transfer by transmitting the control error packet to the wireless power transmitter.

In the resonance mode to be described below, power transfer may be conducted differently from the induction mode. In the resonance mode, one wireless power transmitter should be able to serve a plurality of wireless power receivers simultaneously. However, when power transfer is controlled as in the induction mode, since transferred power is controlled by communication with one wireless power receiver, it may be difficult to control power transfer for additional wireless power receivers. Therefore, in the resonance mode according to the present disclosure, a wireless power transmitter transmits basic power commonly to wireless power receivers, and a wireless power receiver may control the amount of received power by controlling its own resonant frequency. However, even in the resonance mode, the method described with reference to FIG. 6 is not completely excluded; rather, control of additional transmission power may be performed according to the method of FIG. 6.

Figure 7:
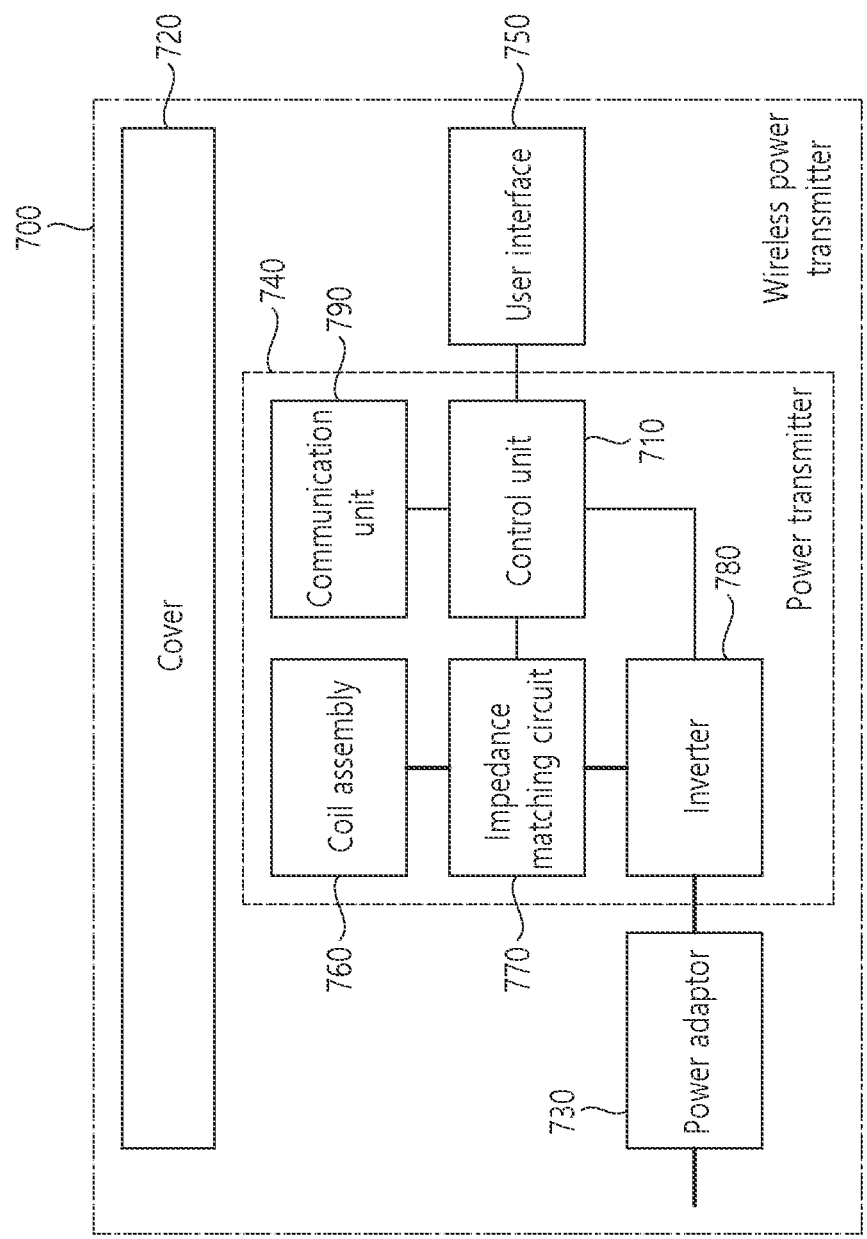
FIG. 7 illustrates a block diagram of a wireless power transmitter according to another embodiment.

FIG. 7 illustrates a block diagram of a wireless power transmitter according to another embodiment. The block diagram may belong to a wireless power transmission system in the magnetic resonance method or shared mode. The shared mode may refer to a mode in which wireless power transmitters and receivers perform one-to-many communication and charging. The shared mode may be implemented by using the magnetic induction method or resonance method.

Referring to FIG. 7, the wireless power transmitter 700 may include at least one of a cover 720 covering a coil assembly, power adaptor 730 supplying power to a power transmitter 740, power transmitter 740 transmitting wireless power, or user interface 750 providing information about progress of power transfer and other related matters. In particular, the user interface 750 may be optionally included or included as another user interface 750 of power transmission equipment.

The power transmitter 740 may include at least one of a coil assembly 760, impedance matching circuit 770, inverter 780, communication unit 790, or control unit 710.

The coil assembly 760 includes at least one primary coil generating a magnetic field and may be referred to as a coil cell.

The impedance matching circuit 770 provides impedance matching between the inverter 780 and the primary coil(s). The impedance matching circuit 770 may generate resonance at a frequency suitable for boosting the primary coil current. In the multi-coil power transmitter 740, the impedance matching circuit may additionally include a multiplexer which routes a signal to a subset of the primary coils at the inverter 780. The impedance matching circuit 770 may also be referred to as a tank circuit.

The impedance matching circuit 770 may include capacitors, inductors, and switching elements that switch connections among capacitors and inductors. Matching of impedance may be performed by detecting a reflected wave of wireless power transmitted through the coil assembly 760 and adjusting a connected state of a capacitor or an inductor by switching the switching element based on the reflected wave or by adjusting capacitance of a capacitor or by adjusting inductance of an inductor. Depending on the needs, the impedance matching circuit 770 may be omitted, and the present specification also includes an embodiment of the wireless power transmitter 700 in which the impedance matching circuit 770 is omitted.

The inverter 780 may convert an DC input to an AC signal. The inverter 780 may be driven in a half-bridge or full-bridge structure to generate a pulse wave and duty cycle of an adjustable frequency. Also, the inverter may include a plurality of stages to adjust an input voltage level.

The communication unit 790 may perform communication with a power receiver. The power receiver performs load modulation to communicate a request and information with a power transmitter. Therefore, the power transmitter 740 may monitor amplitude and/or phase of a current and/or voltage of the primary coil by using the communication unit 790 to demodulate data transmitted from the power receiver.

Also, the power transmitter 740 may control output power to transmit data through the communication unit 790 by using the Frequency Shift Keying (FSK) scheme.

The control unit 710 may control communication and power transfer of the power transmitter 740. The control unit 710 may control power transfer by adjusting the aforementioned operating point. The operating point may be determined, for example, by at least one of the operating frequency, duty cycle, and input voltage.

The communication unit 790 and control unit 710 may be implemented by separate units/elements/chipsets or by a single unit/element/chipset.

Figure 8:
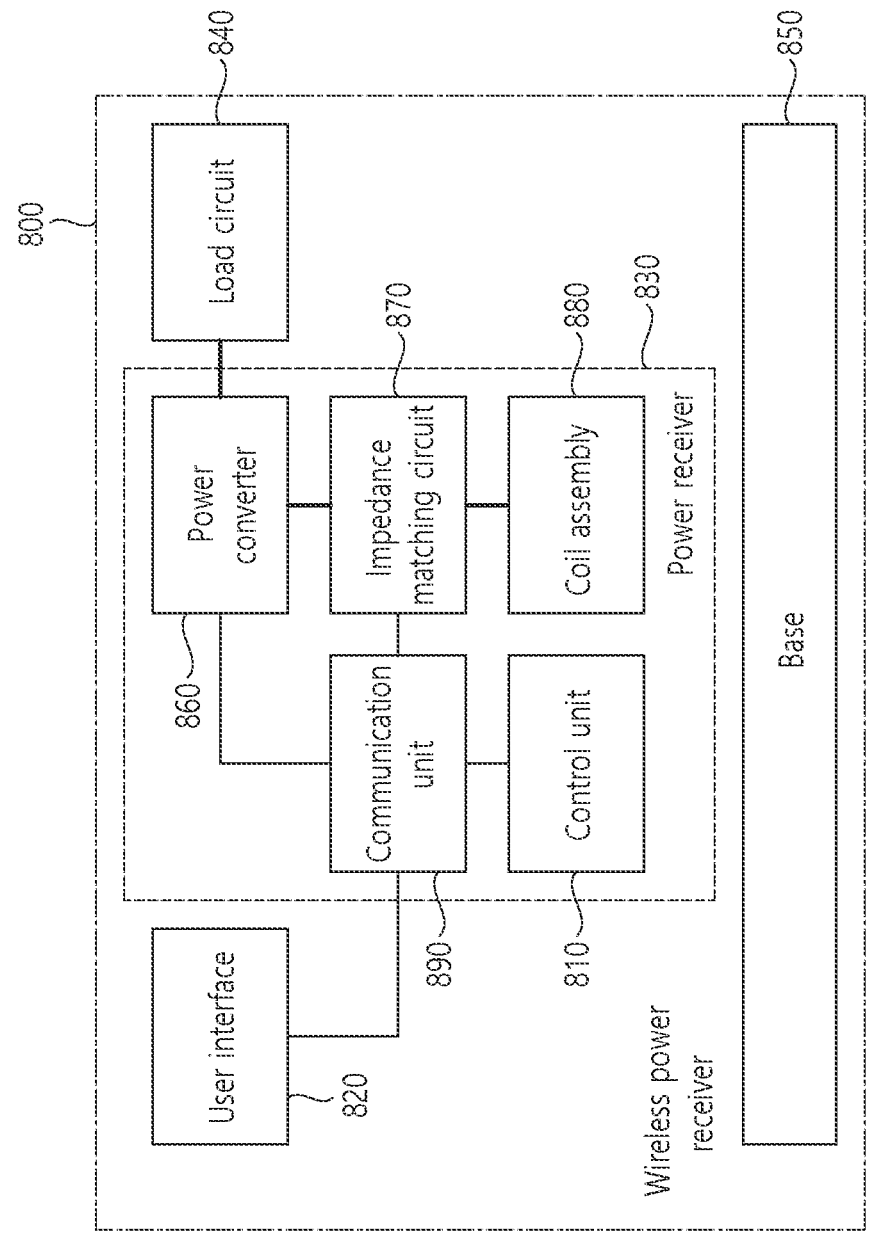
FIG. 8 illustrates a block diagram of a wireless power receiver according to another embodiment.

FIG. 8 illustrates a block diagram of a wireless power receiver according to another embodiment. The block diagram may belong to a wireless power transmission system in the magnetic resonance method or shared mode.

In FIG. 8, the wireless power receiver 800 may include at least one of a user interface 820 providing information about progress of power transfer and other related matters; power receiver 830 receiving wireless power; and base 850 supporting and covering a load circuit 840 or coil assembly. In particular, the user interface 820 may be optionally included or included as another user interface 820 of power reception equipment.

The power receiver 830 may include at least one of a power converter 860, impedance matching circuit 870, coil assembly 880, communication unit 890, or control unit 810.

The power converter 860 may convert AC power received from the secondary coil into voltage and current suitable for the load circuit. As an embodiment, the power converter 860 may include a rectifier. The rectifier rectifies received wireless power and converts an AC signal to a DC signal. The rectifier may convert an AC signal to a DC signal by using a diode or transistor and smooth the converted signal by using a set of capacitors and resistors. Rectifiers may be implemented by using full-wave rectification based on a bridge circuit, half-wave rectification, or voltage multiplication. In addition, the power converter may adapt to the reflected impedance of the power receiver.

The impedance matching circuit 870 may provide impedance matching between a combination of the power converter 860 and the load circuit 840 and the secondary coil. As an embodiment, the impedance matching circuit may generate resonance around 100 kHz which may reinforce power transfer. The impedance matching circuit 870 may include capacitors, inductors, and switching elements that switch between combinations thereof. Matching of impedance may be performed by controlling switching elements constituting the impedance matching circuit 870 based on the voltage, current, power, and frequency value of received wireless power. Depending on the needs, the impedance matching circuit 870 may be omitted, and the present specification also includes an embodiment of the wireless power receiver 800 in which the impedance matching circuit 870 is omitted.

The coil assembly 880 may include at least one secondary coil and optionally further include an element which shields a metallic part of the receiver against a magnetic field.

The communication unit 890 may perform load modulation to communicate a request and information with a power transmitter.

To this purpose, the power receiver 830 may switch resistors or capacitors to change the reflected impedance.

The control unit 810 may control received power. To this purpose, the control unit 810 may determine/calculate a difference between an actual operating point and a desired operating point of the power receiver 830. And the control unit 810 may adjust/reduce the difference between an actual operating point and a desired operating point by performing adjustment of reflected impedance of the power transmitter and/or fulfilling the operating point adjustment request of the power transmitter. When this difference is minimized, optimal power reception may be performed.

The communication unit 890 and control unit 810 may be implemented by separate units/elements/chipsets or by a single unit/element/chipset.

Figure 9:
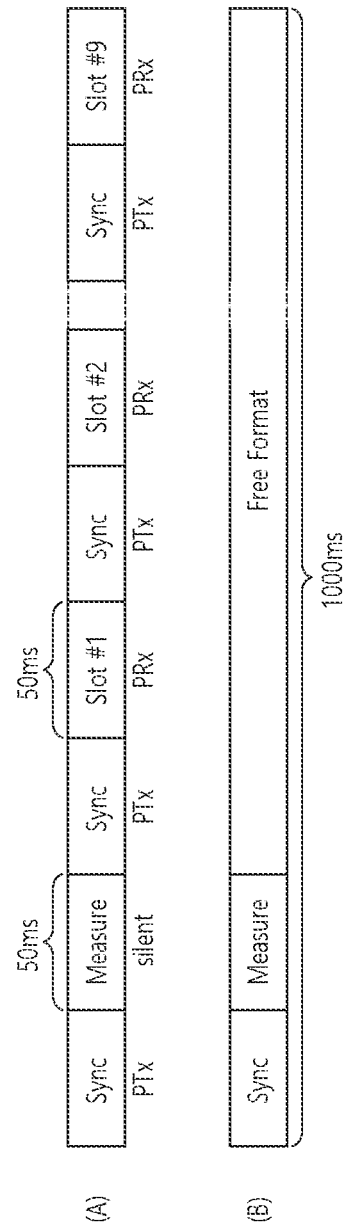
FIG. 9 illustrates a communication frame structure according to one embodiment.

FIG. 9 illustrates a communication frame structure according to one embodiment. This frame structure may be a communication frame structure in the shared mode.

Referring to FIG. 9, in the shared mode, different types of frames may be used together. For example, in the shared mode, a slotted frame having a plurality of slots as shown in (A) and a free format frame without a specific frame as shown in (B) may be used. More specifically, the slotted frame is intended for a wireless power receiver 200 to transmit short data packets to a wireless power transmitter 100, and the free format frame does not have a plurality of slots, thereby allowing transmission of long data packets.

Meanwhile, the slotted frame and free format frame may be changed to various names by those skilled in the art. For example, the slotted frame may be called a channel frame, and the free format frame may be called a message frame.

More specifically, the slotted frame may include a sync pattern indicating the start of a slot, measurement slot, nine slots, and an additional sync pattern having the same time interval before each of the nine slots.

Here, the additional sync pattern is different from the sync pattern indicating the start of the frame described above. More specifically, the additional sync pattern does not indicate the start of the frame but shows information related to adjacent slots (namely, two consecutive slots placed at both sides of the sync pattern).

A sync pattern may be located between any two consecutive slots of the nine slots. In this case, the sync pattern may provide information related to the two consecutive slots.

Also, the nine slots and sync patterns provided before the respective nine slots may have the same time interval. For example, the nine slots may have a time interval of 50 ms. Also, the nine sync patterns may have a time length of 50 ms.

Meanwhile, the free format frame as shown in (B) may not have a specific form except for the sync pattern indicating the start of the frame and the measurement slot. In other words, the free format frame is intended to perform a role different from that of the slotted frame; for example, the free format frame may be used for performing communication of long data packets (for example, additional owner information packets) between a wireless power transmitter and a wireless power receiver or for selecting any one from among a plurality of coils in a wireless power transmitter composed of the plurality of coils.

In what follows, a sync pattern included in each frame will be described in more detail with reference to a related figure.

FIG. 10 illustrates a structure of a sync pattern according to one embodiment.

Referring to FIG. 10, a sync pattern may be composed of a preamble, start bit, response field, type field, info field, and parity bit. In FIG. 10, the start bit is set to ZERO.

More specifically, a preamble is composed of consecutive bits which may all be set to 0s. In other words, the preamble may be composed of bits to conform to the time length of a sync pattern.

The number of bits constituting the preamble may depend on the operating frequency in a way that the length of the sync pattern is closest to 50 ms but does not exceed 50 ms. For example, if the operating frequency is 100 kHz, the sync pattern may comprise two preamble bits while, if the operating frequency is 105 kHz, the sync pattern may comprise three preamble bits.

The start bit is a bit following the preamble and may be set to ZERO. The ZERO may be a bit indicating the type of the sync pattern. Here, the type of sync pattern may include a frame sync including information related to the frame and a slot sync including information about the slot. In other words, the sync pattern may be a frame sync which is located between consecutive frames and indicates the start of the frame or a slot sync which is located between consecutive slots among a plurality of slots constituting the frame and includes information related to the consecutive slots.

For example, if the ZERO is 0, it indicates a slot sync where the corresponding sync is located between slots while, if the ZERO is 1, it indicates a frame sync where the corresponding sync pattern is located between frames.

The parity bit is the last bit of the sync pattern and indicates the number of bits constituting data fields (namely, response field, type field, and information field) of the sync pattern. For example, the parity bit is 1 when the number of bits constituting data fields of the sync pattern is even and 0, otherwise (namely, when it is odd).

The response field may include response information of a wireless power transmitter with respect to communication with a wireless power receiver within the slot before the sync pattern. For example, the response field may be '00' if communication with the wireless power receiver is not detected. Similarly, the response field may be '01' if a communication error is detected in communication with the wireless power receiver. The communication error may indicate a case in which two or more wireless power receivers attempt to approach one slot and two or more wireless power receivers collide with each other.

Also, the response field may include information indicating whether a data packet has been received correctly from the wireless power receiver. More specifically, the response field may be "10" (10—not acknowledge (NAK)) when the wireless power transmitter denies a data packet while it may be "11" (11—acknowledge (ACK)) when the wireless power transmitter confirms the data packet.

The type field may indicate the type of a sync pattern. More specifically, the type field may be '1' to indicate a frame sync if the sync pattern is the first sync pattern of a frame (namely, the first sync pattern of the frame when the sync pattern is located before the measurement slot).

Also, the type field may be '0' to indicate a slot sync if the sync pattern is not the first sync pattern of the frame.

Also, the meaning of the information field may be determined according to the type of sync pattern indicated by the type field. For example, if the type field is 1 (namely in the case of frame sync), the meaning of the info field may indicate the type of a frame. In other words, the info field may indicate whether a current frame is a slotted frame or free-format frame. For example, if the info field is '00', it may indicate a slotted frame while, if the info field is '01', it may indicate a free-format frame.

Unlike the above, if the type field is 0 (namely in the case of slot sync), the info field may indicate the state of the next slot located behind the sync pattern. More specifically, the info field is '00' if the next slot is a slot allocated to a specific wireless power receiver; '01' if the next slot is a slot locked to be used temporarily by a specific wireless power receiver; or '10' if the next slot is a slot freely available for an arbitrary wireless power receiver.

Figure 11:
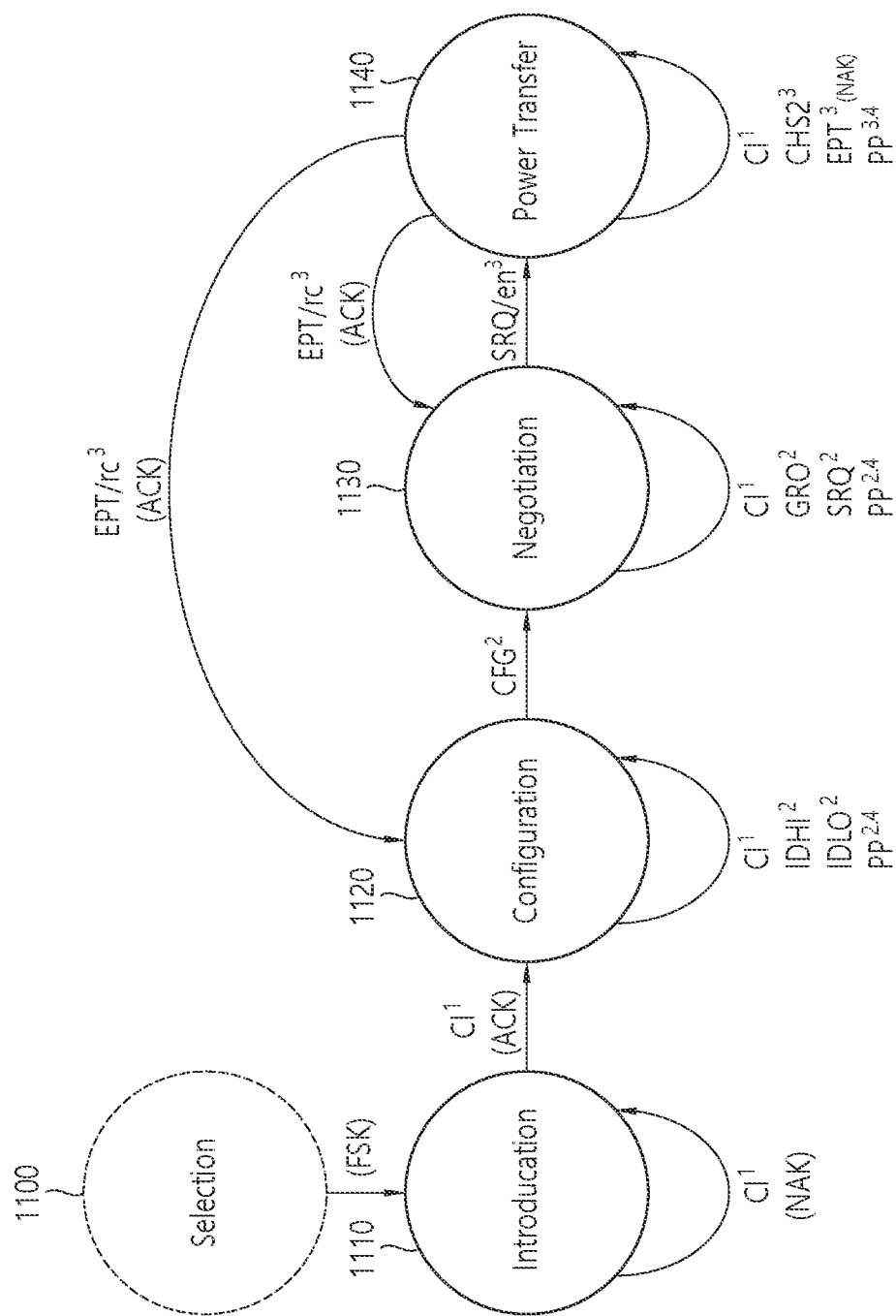
FIG. 11 illustrates operation states of a wireless power transmitter and a wireless power receiver in a shared mode according to one embodiment.

FIG. 11 illustrates operation states of a wireless power transmitter and a wireless power receiver in a shared mode according to one embodiment.

Referring to FIG. 11, a wireless power receiver operating in the shared mode may operate in one of selection phase 1100, introduction phase 1110, configuration phase 1120, negotiation phase 1130, and power transfer phase 1140.

First, a wireless power transmitter according to one embodiment may transmit a wireless power signal to detect a wireless power receiver. In other words, a process of detecting a wireless power receiver by using a wireless power signal may be called analog ping.

Meanwhile, the wireless power receiver which has received a wireless power signal may enter the selection phase 1100. The wireless power receiver which has entered the selection phase 1100 may detect existence of an FSK signal on the wireless power signal as described above.

In other words, the wireless power receiver may perform communication via either exclusive mode or shared mode depending on existence of the FSK signal.

More specifically, the wireless power receiver may operate in the shared mode if an FSK signal is included in a wireless power signal and otherwise operate in the exclusive mode.

If the wireless power receiver operates in the shared mode, the wireless power receiver may enter the introduction phase 1110. In the introduction phase 1110, the wireless power receiver may transmit a control information (CI) packet to the wireless power transmitter to transmit the CI packet in the configuration phase, negotiation phase, and power transfer phase. The control information packet may have a header and information related to control. For example, the header of the control information packet may be 0X53.

In the introduction state 1110, the wireless power receiver performs an attempt for requesting a free slot to transmit a CI packet throughout the subsequent configuration, negotiation, and power transfer phase. At this time, the wireless power receiver selects a free slot and transmits an initial CI packet. If the wireless power transmitter responds to the corresponding CI with ACK, the wireless power transmitter enters the configuration phase. If the wireless power transmitter responds with NACK, it indicates that other wireless power receiver is under progress through the configuration and negotiation phase. In this case, the wireless power receiver re-attempts to request a free slot.

If the wireless power receiver receives ACK as a response to the CI packet, the wireless power receiver determines the location of a private slot within the frame by counting the remaining slot syncs up to the initial frame sync. In all subsequent slot based frames, the wireless power receiver transmits the CI packet through the corresponding slot.

If the wireless power transmitter allows the wireless power receiver to proceed to the configuration phase, the wireless power transmitter provides a locked slot series for an exclusive use of the wireless power receiver. This ensures that the wireless power receive proceed to the configuration phase without collision.

The wireless power receiver transmits sequences of data packets such as two identification data packets (IDHI and IDLO) by using a locked slot. After completing the present phase, the wireless power receiver enters the negotiation phase. In the negotiation phase, the wireless power transmitter continues to provide a locked slot to the wireless power receiver for an exclusive use. This ensures that the wireless power receiver proceeds the negotiation phase without collision.

The wireless power receiver may transmit one or more negotiation data packets by using the corresponding locked slot, which may be mixed with private data packets. As a result, the corresponding sequence is terminated together with a specific request (SRQ) packet. If the corresponding sequence is completed, the wireless power receiver enters the power transfer phase, and the wireless power transmitter stops providing a locked slot.

In the power transfer state, the wireless power receiver performs transmission of a CI packet and receives power by using an allocated slot. The wireless power receiver may include a regulator circuit. The regulator circuit may be included in the communication & control unit. The wireless power receiver may self-regulate the reflected impedance of the wireless power receiver through the regulator circuit. In other words, the wireless power receiver may adjust reflected impedance to transmit the amount of power requested by an external load. This may prevent reception of excessive power and overheating.

In the shared mode, since the wireless power transmitter may not perform adjusting power in response to a received CI packet (depending on the operating mode), control may be necessary to prevent an overvoltage state.

In what follows, authentication between a wireless power transmitter and a wireless power receiver will be disclosed.

A wireless power transmission system employing in-band communication may use USB-C authentication. The authentication includes authentication of the wireless power transmitter conducted by the wireless power receiver and authentication of the wireless power receiver conducted by the wireless power transmitter.

FIG. 12 illustrates a wireless charging certificate format according to one embodiment.

Referring to FIG. 12, the wireless charging certificate format includes Qi authentication certificate structure version, reserved bit, PTx leaf, certificate type, signature offset, serial number, issuer ID, subject ID, public key, and signature.

In the wireless charging certificate format, the PTx leaf is assigned to the bits different from those for the certificate type within the same byte (B0).

The PTx leaf indicates whether the corresponding certificate is a leaf certificate and whether the corresponding certificate is related to a wireless power transmitter. In other words, the PTx leaf may indicate whether the corresponding certificate is a leaf certificate about a wireless power transmitter.

The PTx leaf may be a 1-bit indicator. If the PTx leaf is 0, it may indicate that the corresponding certificate is not a leaf certificate or that the corresponding certificate is a leaf certificate of a wireless power receiver. On the other hand, if the PTx and leaf is 1, it may indicate that the corresponding certificate is a leaf certificate of a wireless power transmitter.

The certificate type, a two-bit indicator, for example, may indicate that the corresponding certificate is any one of a root certificate/intermediate certificate/leaf certificate or may indicate all of the certificates.

Figure 13:
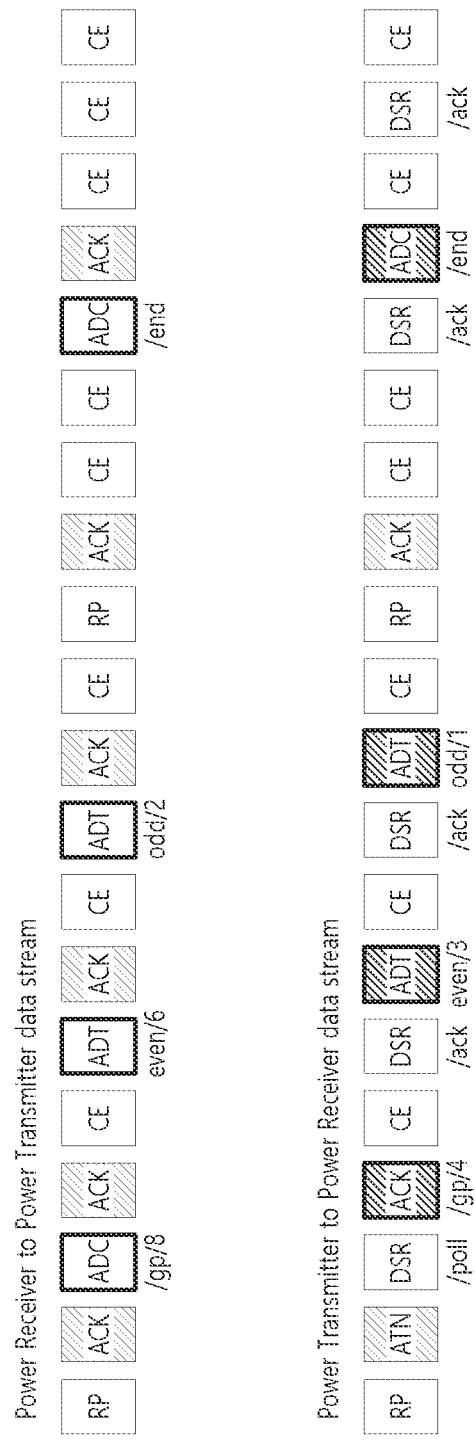
FIG. 13 illustrates a data stream at an application level between a wireless power transmitter and a wireless power receiver according to one embodiment.

FIG. 13 illustrates a data stream at an application level between a wireless power transmitter and a wireless power receiver according to one embodiment.

Referring to FIG. 13, a data stream may include an auxiliary data control (ADC) data packer and/or an auxiliary data transport (ADT) data packet.

The ADC data packet is used for opening a data stream. The ADC data packet may indicate the type of a message included in the stream and the number of data bytes. Meanwhile, the ADT data packet is sequences of data containing an actual message. The ADC/end data packet is used to inform of the end of a stream. For example, the maximum number of data bytes within a data transmission stream may be limited to 2047.

To notify of normal reception of the ADC and ADT data packets, ACK or NACK is used. Between transmission timing of the ADC and ADT data packets, information required for wireless charging such as control error packet (CEP) or data stream response (DSR) data packet may be transmitted.

By using the data stream structure, authentication-related information or information at other application level may be transmitted and received between a wireless power transmitter and a wireless power receiver.

Figure 14:
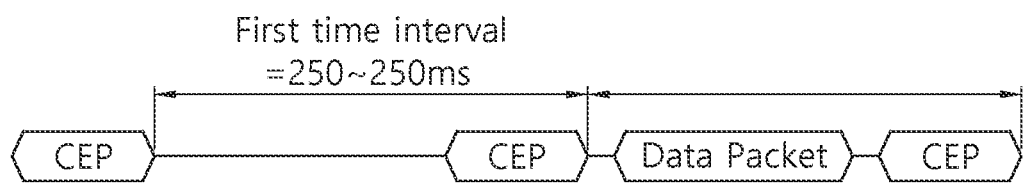
FIG. 14 illustrates a method for exchanging data between a wireless power transmitter and a wireless power receiver based on a first time interval according to one embodiment.

FIG. 14 illustrates a method for exchanging data between a wireless power transmitter and a wireless power receiver based on a first time interval according to one embodiment. The data exchange method corresponds to the protocol for versions lower than the specification v1.3 of the Wireless Power Consortium (WPC).

Referring to FIG. 14, the control error packet (CEP) is transmitted from a wireless power receiver to a wireless power transmitter in a first time interval or with the corresponding period. Here, the first time interval between CEPs is a parameter applied to a wireless power transmitter and a wireless power receiver complying with the specification of which the version (for example, v1.2.4) is lower than the specification v1.3 of the WPC. For example, according to the WPC specification v1.2.4, the first time interval may be 250 ms. In this case, CEP may be transmitted from a wireless power receiver to a wireless power transmitter at every 250 ms. Similarly, the target of the first time interval may be 250 ms, and the maximum value thereof may be given as 350 ms. In this case, CEP may be transmitted according to a time interval corresponding to a value ranging from 250 ms to 350 ms. Provided that wireless power transmission is performed in a stable manner, the first time interval may converge to a relatively constant value. In the present specification, the first time interval ranges from 250 ms to 350 ms, the target value of the first time interval is 250 ms, and the maximum value of the first time interval is 350 ms. However, the aforementioned values are merely an example, and specific values related to the first time interval may be naturally defined by other values. It should be noted, however, that specific values related to the first time interval are defined to be smaller than the specific values related to a second time interval to be described later.

Meanwhile, in the extended power profile (EPP), data packets are exchanged through two-way communication. One example of two-way communication includes transmission of a data packet by a wireless power transmitter to a wireless power receiver according to the Frequency Shift Keying (FSK) scheme and transmission of a data packet by the wireless power receiver to the wireless power transmitter according to the Amplitude Shift Keying (ASK) scheme.

The transmission timing of a data packet should be designed so that the data packet does not collide with a CEP. Therefore, a data packet at the application level such as an ADC data packet, ADT data packet, and DSR data packet may be transmitted from the wireless power transmitter to the wireless power receiver or from the wireless power receiver to the wireless power transmitter in a time interval or with a period of the CEP.

Figure 15:
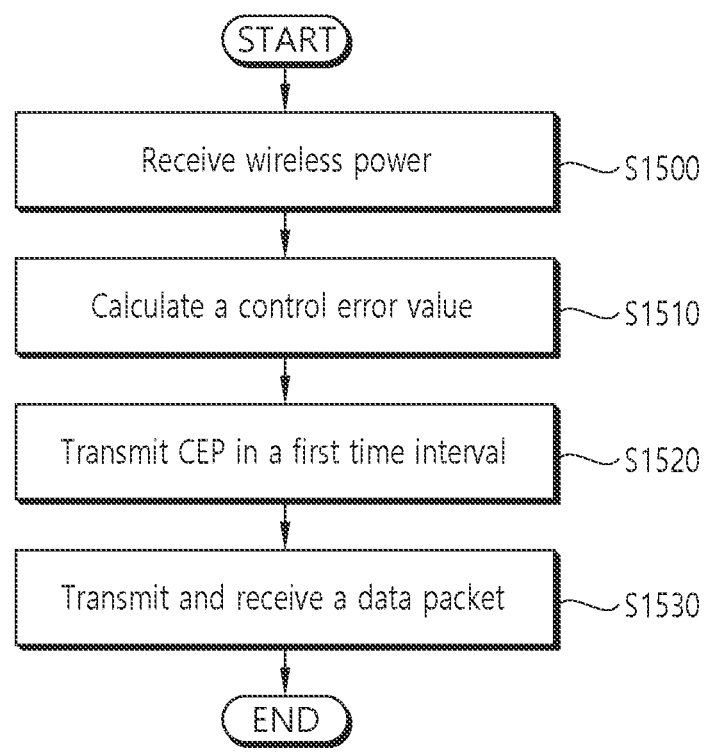
FIG. 15 is a flow diagram illustrating operations of a wireless power receiver in exchanging data between the wireless power receiver and a wireless power transmitter according to the method described with reference to FIG. 14.

FIG. 15 is a flow diagram illustrating operations of a wireless power receiver in exchanging data between the wireless power receiver and a wireless power transmitter according to the method described with reference to FIG. 14.

Referring to FIG. 15, a wireless power receiver receives wireless power from a wireless power transmitter through magnetic coupling with the wireless power transmitter and converts an AC signal generated by the wireless power to a DC signal S1500. The S1500 step may be performed by a power pick-up unit.

The wireless power receiver calculates a control error (CE) value with respect to the wireless power received in the power transfer phase from the wireless power transmitter S1510. As one example, the wireless power receiver may calculate a control error value based on a difference value between the power requested by the wireless power receiver and the power received from the wireless power transmitter. To describe in more detail, the wireless power receiver may select a desired control point—desired output current/voltage, temperature at a specific position on a mobile device, and so on—and additionally determine an actual control point currently operating. The wireless power receiver may calculate a control error value by calculating a difference between the desired control point and the actual control point and transmit the calculated control error value to the wireless power transmitted through a control error packet (CEP).

The wireless power receiver configures a control error packet (CEP) including the calculated control error value and transmits the configured CEP to the wireless power transmitter in the first time interval S1520. If power is received in a stable manner for the wireless power receiver to transmit the CEP, the wireless power receiver may transmit the CEP in the first time interval (for example, 250 ms). In this case, the wireless power receiver may transmit a data packet to the wireless power transmitter in the first time interval, or the wireless power transmitter may transmit a data packet to the wireless power receiver in the first time interval S1530.

Meanwhile, in case the wireless power receiver is unable to receive power in a stable manner, the wireless power transmitter may transmit the CEP at shorter time intervals for stable power reception of power. However, since the size of a data packet is fixed, if the time interval between the CEPs becomes short, it is not possible to transmit the data packet.

For authentication between a wireless power transmitter and a wireless power receiver, a large amount of authentication data has to be transmitted and received, and a large amount of data is needed for performing an additional function by using other data in addition to authentication. However, the time interval between CEPs may act as a limitation on the transmission of a large amount of data. For example, if the time interval between CEPs is short, since data has to be divided into small pieces and transmitted little by little in the time intervals between the CEPs, it takes a considerable time to transmit a large amount of data.

In other words, if at least one of the wireless power transmitter and the wireless power receiver complies with a lower version specification such as v1.2.4 of the WPC specification according to FIGS. 14 and 15, a problem occurs that a considerable time is needed for the wireless power transmitter and receiver to perform two-way communication based on the EPP.

Therefore, in addition to the first time interval defined in a lower version (for example, v1.2.4) of the WPC specification, the present embodiment defines a new time interval for the CEP, namely a second time interval larger than the first time interval, which may be applied to a wireless power transmitter and a wireless power receiver developed or implemented based on a higher version (for example, v1.3) of the WPC specification. The second time interval may be larger than the first time interval by two times or more. More specifically, the maximum value of the second time interval may be larger than the maximum value of the first time interval by two times or more. The present embodiment is highly applicable to products developed based on the WPC specification v1.3 and is related to enhancement of performance of a new data transport protocol specification. Also, the present embodiment discloses a method for exchanging data when two-way communication is performed through an EPP according to the WPC specification.

Figure 16:
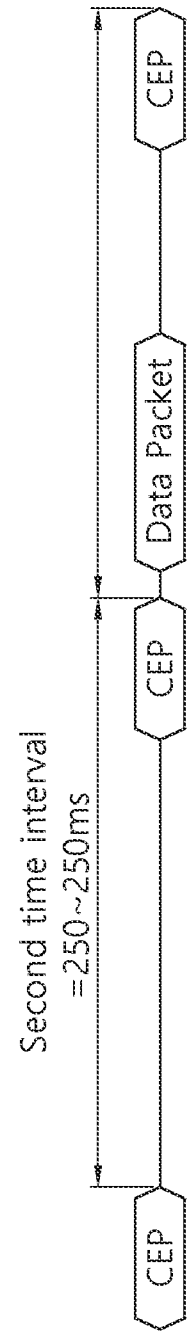
FIG. 16 illustrates a method for exchanging data between a wireless power transmitter and a wireless power receiver based on a second time interval according to another embodiment.

FIG. 16 illustrates a method for exchanging data between a wireless power transmitter and a wireless power receiver based on a second time interval according to another embodiment. The data exchange method corresponds to the protocol for versions lower than the specification v1.3 of the Wireless Power Consortium (WPC).

Referring to FIG. 16, the control error packet (CEP) is transmitted from a wireless power receiver to a wireless power transmitter in a second time interval or with the corresponding period. Here, the second time interval between CEPs is a parameter applied to a wireless power transmitter and a wireless power receiver complying with the specification v1.3 of the WPC. For example, according to the WPC specification v1.3, the second time interval may be 250 ms. In this case, CEP may be transmitted from a wireless power receiver to a wireless power transmitter at every 250 ms. Similarly, the target of the second time interval may be 250 ms, and the maximum value thereof may be given as 1000 ms. In this case, CEP may be transmitted according to a time interval corresponding to a value ranging from 250 ms to 1000 ms. Similarly, the target of the second time interval may be 250 ms, and the maximum value thereof may be given as 700 ms. In this case, CEP may be transmitted according to a time interval corresponding to a value ranging from 250 ms to 700 ms.

Provided that wireless power transmission is performed in a stable manner, the second time interval may converge to a relatively constant value. In the present specification, the second time interval ranges from 250 ms to 1000 ms or from 250 ms to 700 ms, the target value of the second time interval is 250 ms, and the maximum value of the second time interval is 1000 ms or 700 ms. However, the aforementioned values are merely an example, and specific values related to the second time interval may be naturally defined by other values. It should be noted, however, that the other values may be defined to be larger than the specific values related to the aforementioned second time interval.

Figure 17:
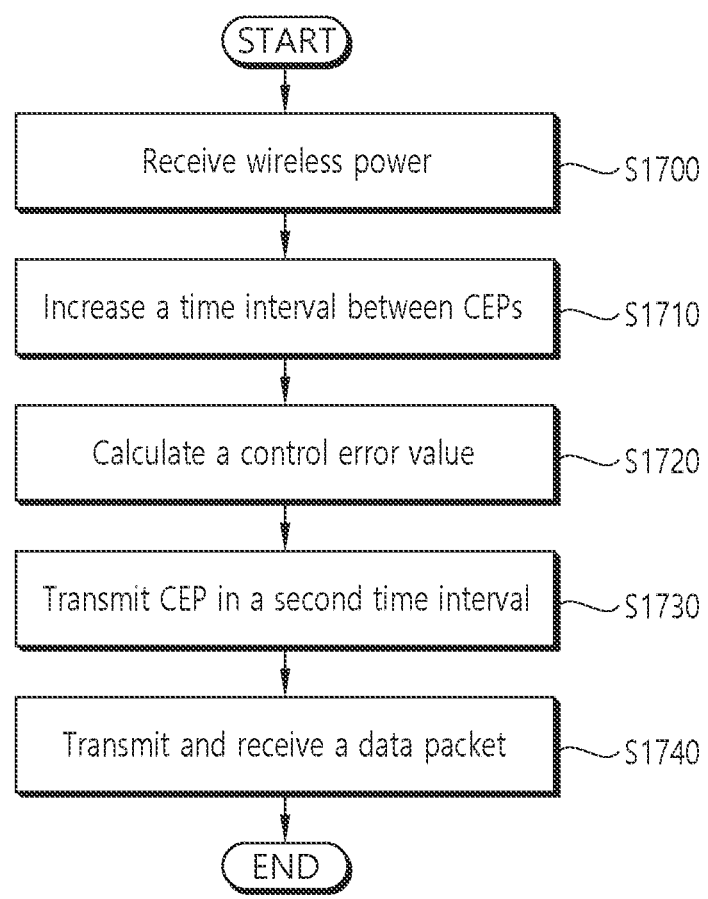
FIG. 17 is a flow diagram illustrating operations of a wireless power receiver in exchanging data between the wireless power receiver and a wireless power transmitter according to the method described with reference to FIG. 16.

FIG. 17 is a flow diagram illustrating operations of a wireless power receiver in exchanging data between the wireless power receiver and a wireless power transmitter according to the method described with reference to FIG. 16.

Referring to FIG. 17, a wireless power receiver receives wireless power from a wireless power transmitter through magnetic coupling with the wireless power transmitter and converts an AC signal generated by the wireless power to a DC signal S1700. The S1700 step may be performed by a power pick-up unit.

The wireless power receiver increases or sets the time interval between CEPs to the second time interval (for example, a maximum value of 700 ms or 1000 ms) S1710. Here, the operation for the wireless power receiver to set or change the time interval between the CEPs to the second time interval may be defined by using various embodiments.

In one example, when wireless power is received in a stable manner, the wireless power receiver may set or change the time interval between the CEPs to the second time interval. When reception of wireless power is unstable, it may be difficult to increase the time interval between the CEPs because precise power control is needed.

In another example, in case both of a wireless power transmitter and a wireless power receiver comply with the WPC specification v1.3 and perform two-way communication based on the EPP, the wireless power receiver may set or change the time interval between the CEPs to the second time interval. As described above, since only the first time interval is defined in lower versions of the WPC specification (for example, v1.2.4), there is a limitation in supporting transmission of a large amount of data. Accordingly, the present disclosure defines the second time interval that complies with v1.3, a higher version of the WPC specification, in addition to the first time interval to support transmission of a large amount of data. It should be noted, however, that even if one of the wireless power receiver and the wireless power transmitter supports v1.3, a higher version of the WPC specification, only the first time interval according to a lower version of the WPC specification is used as the time interval between the CEPs if the other one supports the lower version of the WPC specification. Therefore, according to the present disclosure, if both of a wireless power transmitter and a wireless power receiver comply with v1.3 of the WPC specification and perform two-way communication based on the EPP, the wireless power receiver may set or change the time interval between the CEPs to the second time interval.

In yet another example, after transmitting a CEP time change packet that indicates increasing or changing the time interval between the CEPs to the wireless power transmitter, the wireless power receiver may set or change the time interval between the CEPs to the second time interval. In changing the time interval between the CEPs to the second time interval rather than the first time interval, the wireless power receiver may first signal the attempt explicitly to the wireless power transmitter to perform changing or increasing the time interval between the CEPs.

In still yet another example, when a large amount of data in a higher layer such as authentication or security have to be transmitted, the wireless power receiver may set or change the time interval between the CEPs to the second time interval. This is so because, if transmission is accommodated despite the first time interval, for example, a case where a small amount of data has to be transmitted or received, a data transmission delay does not occur even if the wireless power receiver does not deliberately increase the time interval between the CEPs to the second time interval while both of the wireless power transmitter and the wireless power receiver support v1.3 of the WPC specification. In other words, the second time interval as a time interval between the CEPs may be used selectively by the wireless power receiver if a large amount of data in a higher layer such as authentication or security have to be transmitted.

The wireless power receiver calculates a control error (CE) value with respect to the wireless power received in the power transfer phase from the wireless power transmitter S1720. As one example, the wireless power receiver may calculate a control error value based on a difference value between the power requested by the wireless power receiver and the power received from the wireless power transmitter. To describe in more detail, the wireless power receiver may select a desired control point—desired output current/voltage, temperature at a specific position on a mobile device, and so on—and additionally determine an actual control point currently operating. The wireless power receiver may calculate a control error value by calculating a difference between the desired control point and the actual control point and transmit the calculated control error value to the wireless power transmitted through a CEP.

The wireless power receiver configures a control error packet (CEP) including the calculated control error value and transmits the configured CEP to the wireless power transmitter in the second time interval S1730. In this case, the wireless power receiver may transmit a data packet to the wireless power transmitter in the second time interval, or the wireless power transmitter may transmit a data packet to the wireless power receiver in the second time interval S1740.

As described above, if the time interval between the CEPs is increased from the first time interval to the second time interval, a need for dividing a large amount of data into smaller segments is reduced, and data with a larger size may be transmitted in the time intervals between the CEPs. Therefore, a time needed for transmitting or receiving a large amount of data between the wireless power transmitter and the wireless power receiver.

As described with reference to FIGS. 14 to 17, the time interval between CEPs may be set to the first time interval according to FIG. 14 or FIG. 15 or to the second time interval according to FIG. 16 or FIG. 17 depending on the WPC specification with which the wireless power transmitter and the wireless power receiver comply and whether two-way communication based on the EPP is supported. More specifically, if at least one of the wireless power transmitter and the wireless power receiver supports a lower version (for example, v1.2.4) than v1.3 of the WPC specification as shown in FIG. 14 or FIG. 15, the time interval between the CEPs may be set to the first time interval. And if both of the wireless power transmitter and the wireless power receiver comply with v1.3 of the WPC specification as shown in FIG. 16 or FIG. 17, and two-way communication based on the EPP is performed, the time interval between CEPs may be set to the second time interval.

In other words, based on a type of a power profile and a version of wireless power transfer standard with which the wireless power reception and the wireless power transmitter comply, the wireless power receiver may transmit a CEP including a control error value for wireless power to the wireless power transmitter in the first time interval or second time interval larger than the first time interval.

The wireless power transmitter in the embodiments of FIGS. 14 to 17 corresponds to the wireless power transmitter or power transmitter or transmitter disclosed in FIGS. 1 to 11. Therefore, the operation of the wireless power transmitter in the embodiments of FIGS. 14 to 17 is implemented by a combination of one or two or more constituting elements of the wireless power transmitter of FIGS. 1 to 11. For example, reception of a CEP, processing of data (or packet or signal), and transmission and reception operation by the wireless power transmitter in FIGS. 14 to 17 may be performed by the communication & control unit 120. Also, the wireless power receiver in the embodiments of FIGS. 14 to 17 corresponds to the wireless power receiver or power receiver or receiver disclosed in FIGS. 1 to 11. Therefore, the operation of the wireless power receiver in the embodiments of FIGS. 14 to 17 is implemented by a combination of one or two or more constituting elements of the wireless power receiver of FIGS. 1 to 11. For example, generation of a CEP, configuration of the time interval between CEPs, processing of data (or packet or signal) according to the first time interval or the second time interval, and transmission and reception operation by the wireless power receiver in the present embodiment may be performed by the communication & control unit 220.

As one example, suppose the time interval between CEPs is changed by the wireless power transmitter. If it is confirmed that the time interval between CEPs is stabilized while power is being transmitted to the wireless power receiver in the power transfer phase, the communication & control unit 120 of the wireless power transmitter may increase the time interval between CEPs and at the same time, transmit information about the increased time interval between CEPs to the wireless power receiver. In this case, the communication & control unit 220 of the wireless power receiver may deal with the increased time interval between CEPs by increasing the time interval between CEPs and/or CE time-out based on the information about the time interval between CEPs received from the wireless power transmitter. Afterwards, the communication & control unit 120 may transmit a large amount of data in the increased time interval between CEPs and transmit information for restoring the previous time interval between CEPs if it is confirmed that the wireless power receiver has fully received the large amount of data.

As another example, suppose the time interval between CEPs is changed by the wireless power receiver. If it is confirmed that the time interval between CEPs is stabilized while power is being received from the wireless power transmitter in the power transfer phase, the communication & control unit 220 of the wireless power receiver may increase the time interval between CEPs and at the same time, transmit information about the increased time interval between CEPs to the wireless power transmitter. If the communication & control unit 120 of the wireless power transmitter receives information about the increased time interval between CEPs from the wireless power receiver, the communication & control unit 120 may deal with the increased time interval between CEPs by increasing the time interval between CEPs and/or CE time-out based on the received information. Afterwards, the communication & control unit 220 may transmit a large amount of data to the wireless power transmitter in the increased time interval between CEPs. Then if it is confirmed that the wireless power transmitter has fully received the large amount of data, the communication & control unit 220 may transmit information for restoring the time interval between CEPs increased temporarily for transmission of the large amount of data.

Figure 18:
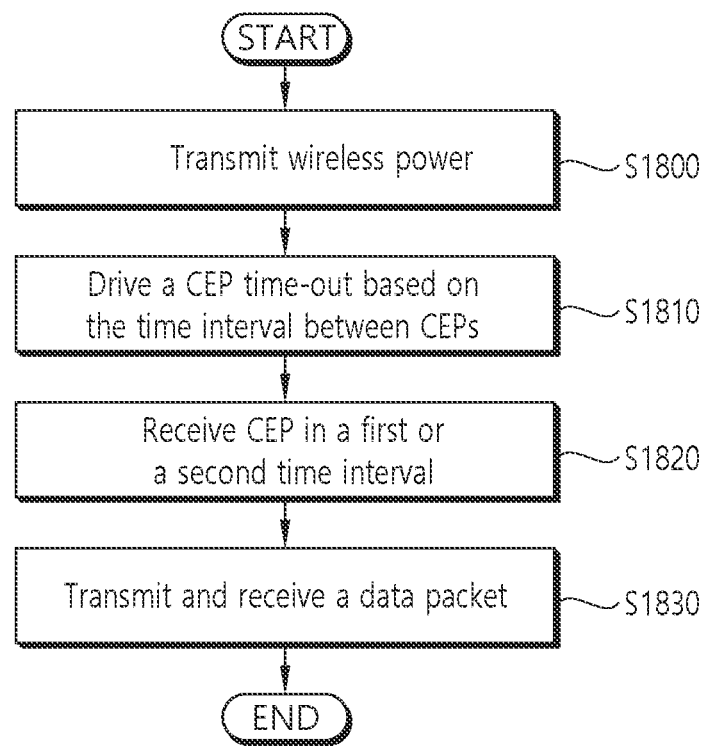
FIG. 18 is a flow diagram illustrating operations of a wireless power transmitter in exchanging data between a wireless power receiver and the wireless power transmitter according to one embodiment.

FIG. 18 is a flow diagram illustrating operations of a wireless power transmitter in exchanging data between a wireless power receiver and the wireless power transmitter according to one embodiment.

Referring to FIG. 18, the wireless power transmitter transmits wireless power to the wireless power receiver through magnetic coupling with the wireless power receiver S1800. The S1800 step may be performed by the power conversion unit.

The wireless power transmitter drives CEP time-out CEP time-out based on the time interval between CEP selected by the wireless power receiver S1810. The CEP time-out corresponds to a maximum time for which the wireless power transmitter may receive a CEP from the wireless power receiver, and if a CEP is not received within the CEP time-out, the wireless power transmitter treats the situation as a "CEP not received" case.

The CEP time-out may be configured variably within a range which is larger than a predetermined minimum value. Here, the minimum value of the CEP time-out should be larger than at least the maximum value of the time interval between CEPs. Otherwise, the CEP time-out may be applied even for normal CEPs. Therefore, if the time interval between CEPs is changed or increased, the CEP time-out is changed or increased accordingly.

The operation for the wireless power transmitter to set or change the CEP time-out based on the second time interval may be defined by using various embodiments.

In one example, when wireless power is received in a stable manner, the wireless power transmitter may configure the CEP time-out according to the second time interval.

In another example, in case both of a wireless power transmitter and a wireless power receiver comply with the WPC specification v1.3 and perform two-way communication based on the EPP, the wireless power transmitter may configure the CEP time-out according to the second time interval.

In yet another example, after receiving a CEP time change packet that indicates increasing or changing the time interval between the CEPs from the wireless power receiver, the wireless power transmitter may configure the CEP time-out according to the second time interval.

In still yet another example, when a large amount of data in a higher layer such as authentication or security have to be transmitted, the wireless power transmitter may configure the CEP time-out according to the second time interval In the examples above, the CEP time-out due to the second time interval between CEPs may be set to range from 700 ms to 1800 ms. If the second time interval (where the maximum value thereof is 700 ms) is used as the time interval between CEPs, the CEP time-out may be set to any value larger than 700 ms. If the first time interval (where the maximum value thereof is 250 ms or 350 ms) is used as the time interval between CEPs, the CEP time-out may be set to any value larger than 250 ms or 350 ms. As described above, depending on the time interval between CEPs, the CEP time-out may be varied, and the first CEP time-out when the time interval between CEPs is the first time interval is smaller than the second CEP time-out when the time interval between CEPs is the second time interval. The first time interval between CEPs is used for a lower version (for example, v1.2.4) of the WPC specification while the second time interval between CEPs is used for a higher version (for example, v1.3) of the WPC specification. Therefore, if the CEP time-out is defined from a perspective of the WPC specification, the CEP time-out may be set to the second time-out when the version of the WPC specification is v1.2.4, and the type of a power profile is EPP.

The wireless power transmitter receives a CEP in the first time interval or second time interval S1820. And the wireless power transmitter may transmit a data packet to the wireless power receiver or receive a data packet from the wireless power receiver in the first time interval or second time interval S1830.

Figure 19:
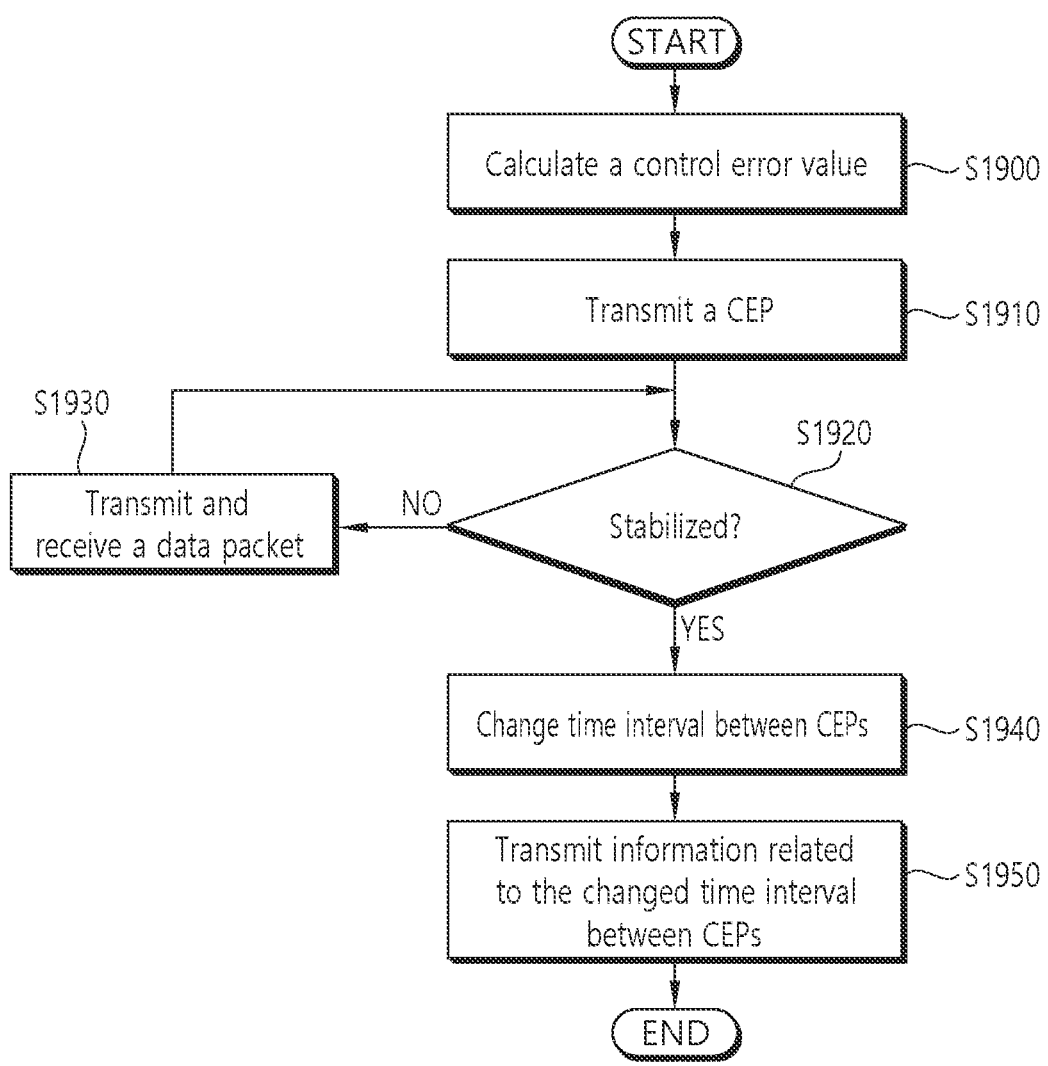
FIG. 19 is a flow diagram illustrating operations of a wireless power receiver in exchanging data between a wireless power receiver and the wireless power transmitter according to another embodiment.

FIG. 19 is a flow diagram illustrating operations of a wireless power receiver in exchanging data between a wireless power receiver and the wireless power transmitter according to another embodiment.

Referring to FIG. 19, the wireless power receiver repeats a process at predetermined intervals, where the wireless power receiver calculates a CE value with respect to the power transmitted by the wireless power transmitter in the power transfer phase S1900 and configures a CEP including the calculated CE value and transmits the configured CEP to the wireless power transmitter S1910. In the present embodiment, methods described with reference to FIGS. 1 to 11 may be performed until the wireless power transmitter and the wireless power receiver come close to the power transfer phase, and the time interval between CEPs is stabilized. Stabilization of the time interval between CEPs indicates that power transfer is being performed in a stable manner. Also, stabilization of the time interval between CEPs indicates that no problem is occurred in sending a large amount of data. Therefore, according to the present disclosure, the wireless power receiver may check whether the time interval between CEPs has been stabilized to transmit a large amount of data S1920. If it is determined that the time interval between CEPs has not been stabilized yet, namely, a load is changing rapidly, the wireless power receiver may transmit and receive a data packet to and from the wireless power transmitter in a time interval between the corresponding CEPs S1930.

If the time interval between CEPs is stabilized, the wireless power receiver may adjust (change) the time interval between CEPs from the previous value of 250 ms to a value larger than 250 ms so that a large amount of data may be transmitted in one CEP time interval S1940. Also, if the time interval between CEPs is changed, the wireless power receiver may inform the wireless power transmitter, by transmitting information related to the time interval between CEPs to the wireless power transmitter, that the wireless power receiver is ready to transmit a large amount of data to the wireless power transmitter. If the wireless power transmitter receives information related to the time interval between CEPs from the wireless power receiver, the wireless power transmitter may transmit a large amount of data to the wireless power receiver by adjusting the time interval between CEPs based on the received information or receive a large amount of data from the wireless power receiver by adjusting the CE time-out. Here, the information related to the time interval between CEPs may include time interval change information between CEPs, CE time-out change information, information for restoring the time interval between CEPs, and information about duration of the changed time interval between CEPs.

Meanwhile, the apparatus which starts adjusting of the time interval between CEPs may be the wireless power transmitter. In this case, if the time interval between CEPs is stabilized, the wireless power transmitter may adjust the time interval between CEPs from the previous value of 250 ms to a value larger than 250 ms and prepare for transmitting a large amount of data. And the wireless power transmitter may transmit information related to the changed time interval between CEPs to the wireless power receiver S1950. If the wireless power receiver receives information related to the changed time interval between CEPs, the wireless power receiver may transmit a large amount of data to the wireless power transmitter by adjusting the time interval between CEPs or receive a large amount of data from the wireless power transmitter by adjusting the CE time-out.

Through the process described above, the wireless power transmitter and the wireless power receiver may receive a large amount of data within the changed (increased) time interval between CEPs and perform additional functions. Here, the additional functions refer to functions using a large amount of data, which include an authentication procedure as a typical example.

The wireless power transmitter in the present embodiment corresponds to the wireless power transmitter or power transmitter or transmitter disclosed in FIGS. 1 to 11. Therefore, the operation of the wireless power transmitter in the present embodiment is implemented by a combination of one or two or more constituting elements of the wireless power transmitter of FIGS. 1 to 11. For example, processing of data (or packet or signal) and transmission and reception operation by the wireless power transmitter in the present embodiment may be performed by the communication & control unit 120. Also, the wireless power receiver in the present embodiment corresponds to the wireless power receiver or power receiver or receiver disclosed in FIGS. 1 to 11. Therefore, the operation of the wireless power receiver in the present embodiment is implemented by a combination of one or two or more constituting elements of the wireless power receiver of FIGS. 1 to 11. For example, processing of data (or packet or signal) and transmission and reception operation by the wireless power receiver in the present embodiment may be performed by the communication & control unit 220.

As one example, suppose the time interval between CEPs is changed by the wireless power transmitter. If it is confirmed that the time interval between CEPs is stabilized while power is being transmitted to the wireless power receiver in the power transfer phase, the communication & control unit 120 of the wireless power transmitter may increase the time interval between CEPs and at the same time, transmit information about the increased time interval between CEPs to the wireless power receiver. In this case, the communication & control unit 220 of the wireless power receiver may deal with the increased time interval between CEPs by increasing the time interval between CEPs and/or CE time-out based on the information about the time interval between CEPs received from the wireless power transmitter. Afterwards, the communication & control unit 120 may transmit a large amount of data in the increased time interval between CEPs and transmit information for restoring the previous time interval between CEPs if it is confirmed that the wireless power receiver has fully received the large amount of data.

As another example, suppose the time interval between CEPs is changed by the wireless power receiver. If it is confirmed that the time interval between CEPs is stabilized while power is being received from the wireless power transmitter in the power transfer phase, the communication & control unit 220 of the wireless power receiver may increase the time interval between CEPs and at the same time, transmit information about the increased time interval between CEPs to the wireless power transmitter. If the communication & control unit 120 of the wireless power transmitter receives information about the increased time interval between CEPs from the wireless power receiver, the communication & control unit 120 may deal with the increased time interval between CEPs by increasing the time interval between CEPs and/or CE time-out based on the received information. Afterwards, the communication & control unit 220 may transmit a large amount of data to the wireless power transmitter in the increased time interval between CEPs. Then if it is confirmed that the wireless power transmitter has fully received the large amount of data, the communication & control unit 220 may transmit information for restoring the time interval between CEPs increased temporarily for transmission of the large amount of data.

Figure 20:
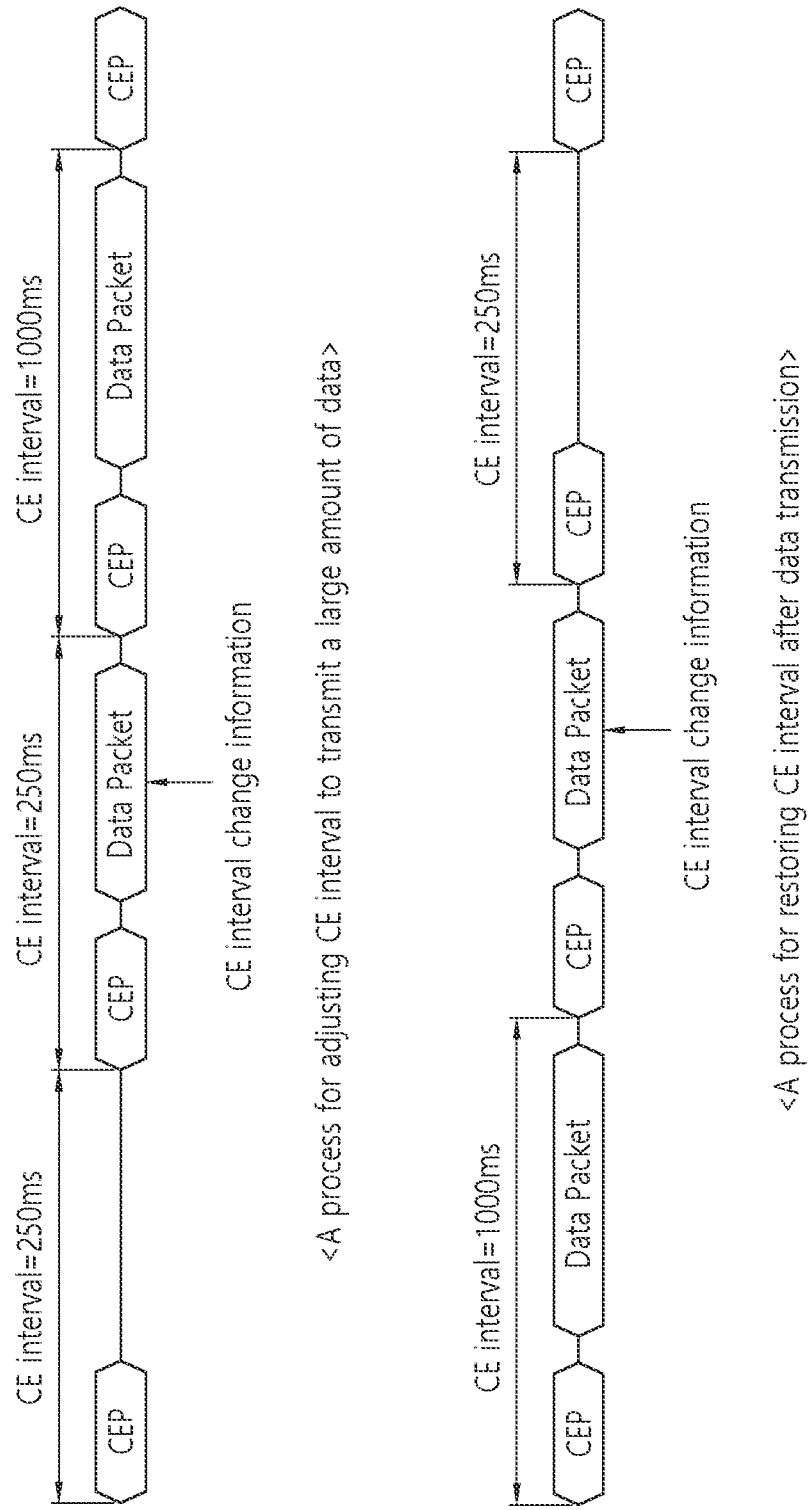
FIG. 20 is a flow diagram illustrating a method for exchanging data between a wireless power transmitter and a wireless power receiver according to another embodiment.

FIG. 20 is a flow diagram illustrating a method for exchanging data between a wireless power transmitter and a wireless power receiver according to another embodiment.

Referring to FIG. 20, described will be a method for transmitting a large amount of data by adjusting the time interval between CEPs of a transmitter and the CEP time-out of a receiver provided that the time interval between CEPs has been stabilized. Here, if the transmitter is a wireless power transmitter, the receiver corresponds to a wireless power receiver, and if the transmitter is a wireless power receiver, the receiver corresponds to a wireless power transmitter.

A CEP is a data packet including a control error (CE) value. A CE value is a difference value between a value set as a target and a currently transmitted value. In case power is transmitted in a stable manner, the difference value is close to '0'. Therefore, that CE values within a plurality of CEPs are maintained within a specific range means that power transfer is being conducted in a stable manner. In this case, each CEP is transmitted at predetermined intervals. In other words, the time interval between CEPs is stabilized. In what follows, such a situation will be called a normal situation or a stabilized situation. As one example, FIG. 20 illustrates a case where a CEP is transmitted at intervals of 250 ms in the stabilized situation. In this situation, the transmitter may transmit time interval change information between CEPs including information for increasing the time interval between CEPs to transmit a large amount of data in a time period between the first CEP and the second CEP, namely in the time interval between CEPs. The time interval change information between CEPs may be transmitted in the form of a data packet at the application level.

The receiver, which has received a signal indicating that the time interval between CEPs is increased beyond 250 ms, namely the time interval change information between CEPs, may prepare for receiving a large amount of data by adjusting a CE time-out. Here, the receiver may set the length of the CE time-out to be longer than the length of the changed time interval between CEPs. For example, suppose the time interval between CEPs is set to 250 ms, and the CE time-out is set to 800 ms. If the transmitter informs the receiver that the transmitter changes the time interval between CEPs to 1000 ms, the receiver may change the CE time-out from 800 ms to 1500 ms. Meanwhile, as one example, although FIG. 20 illustrates a case where the time interval between CEPs is increased from 250 ms to 1000 ms, the time interval between CEPs may be made longer than 1000 ms.

If the time interval between CEPs is increased, the transmitter may send a large amount of data during the increased time interval between CEPs. And if transmission of data is completed, the time interval change information between CEPs including information for restoring the time interval between CEPs is transmitted, and the time interval between CEPs may be restored to 250 ms.

Similarly, the transmitter may transmit information about a period for which the increased time interval between CEPs together when the time interval change information between CEPs is transmitted. In this case, even if no time interval change information between CEPs is received separately from the transmitter, the receiver may restore the time interval between CEPs after the corresponding period is elapsed.

Due to the procedure above, even if the transmitter adjusts the time interval between CEPs to send a large amount of data, since the time at which the receiver falls into a time-out as it fails to receive a CEP is adjusted, a large amount of data may be transmitted and received in a stable manner. Also, due to this feature, a charging time may be more reduced than conventional methods, and additional functions including an authentication procedure may be utilized.

Since not all constituting elements or phases are essential for a wireless power transmission apparatus and method or a wireless power reception apparatus and method according to embodiments of the present disclosure described above, the wireless power transmission apparatus and method or the wireless power reception apparatus and method may be performed by including whole or part of the constituting elements or phases described above. Also, embodiments of the wireless power transmission apparatus and method or the wireless power reception apparatus and method may be performed in combination thereof. Also, the constituting elements or phases do not necessarily have to be performed in the specific order described above, and a phase described later may be performed before a phase described earlier.

The description given above is merely an embodiment for illustrating technical principles of the present disclosure, and various changes and modifications are possible from the disclosure by those skilled in the art to which the present disclosure belongs without deviating from the inherent characteristics of the present disclosure. Therefore, it is possible that embodiments of the present disclosure described above may be implemented individually or in a combination thereof.

Therefore, it should be understood that embodiments disclosed in the present specification are not intended to limit the technical principles of the present disclosure but to support describing the present disclosure, and thus the technical scope of the present disclosure is not limited by the embodiments. The technical scope of the present disclosure should be judged by the appended claims, and all of the technical principles found within the range equivalent to the technical scope of the present disclosure should be interpreted to belong thereto.

What is claimed is:

1. A wireless power receiver for receiving wireless power from a wireless power transmitter in a wireless power transfer system, the wireless power receiver comprising:
a power pick-up circuit configured to:
receive the wireless power from the wireless power transmitter; and
a communication/control circuit configured to:
transmit a control error packet including a control error value for the wireless power to the wireless power transmitter within a first time interval or a second time interval larger than the first time interval, based on a type of a power profile and a version of wireless power transfer standard with which the wireless power receiver and the wireless power transmitter comply,
wherein, based on the version of the wireless power transfer standard being a first version, the wireless power receiver transmits the control error packet within the first time interval, and
based on the version of the wireless power transfer standard being a second version higher than the first version and the type of the power profile being an extended power profile (EPP), the wireless power receiver transmits the control error packet within the second time interval.

2. The wireless power receiver of claim 1, wherein both the wireless power receiver and the wireless power transmitter are operated based on the second version, and
wherein both the wireless power receiver and the wireless power transmitter are operated based on the EPP.

3. The wireless power receiver of claim 2, wherein the wireless power transfer standard is a Wireless Power Consortium (WPC) specification, the first version is lower than v1.3, and the second version is v1.3.

4. The wireless power receiver of claim 2, wherein the first time interval is larger than the second time interval by two times or more.

5. The wireless power receiver of claim 1, wherein, based on the version of the wireless power transfer standard being the second version higher than the first version, the type of the power profile being the EPP, and transmission of a data packet being needed, the wireless power receiver transmits the control error packet within the second time interval.

6. The wireless power receiver of claim 5, wherein the wireless power transfer standard is a Wireless Power Consortium (WPC) specification, the first version is lower than v1.3, and the second version is v1.3.

7. The wireless power receiver of claim 5, wherein the first time interval is larger than the second time interval by two times or more.

8. The wireless power receiver of claim 1, wherein, according to the type of the power profile and the version of the wireless power transfer standard with which the wireless power receiver and the wireless power transmitter comply, a time-out of the control error packet is determined as a first time-out or a second time-out larger than the first time-out.

9. The wireless power receiver of claim 8, wherein, based on the version of the wireless power transfer standard being the first version, the time-out for the control error packet is determined as the first time-out, and based on the version of the wireless power transfer standard being the second version higher than the first version and the type of the power profile being the EPP, the time-out for the control error packet is determined as the second time-out.

10. The wireless power receiver of claim 8, wherein the first time interval is smaller than the first time-out, and the second time interval is smaller than the second time-out.

11. A wireless power transmitter for transmitting wireless power to a wireless power receiver, the wireless power transmitter comprising:
a power conversion circuit configured to transmit the wireless power to the wireless power receiver; and
a communication/control circuit configured to:
receive a control error packet including a control error value for the wireless power from the wireless power receiver within a first time interval or a second time interval larger than the first time interval based on a type of a power profile and a version of wireless power transfer standard with which the wireless power receiver and the wireless power transmitter comply,
wherein, based on the version of the wireless power transfer standard being a first version, the wireless power transmitter receives the control error packet within the first time interval, and based on the version of the wireless power transfer standard being a second version higher than the first version and the type of the power profile being an extended power profile (EPP), the wireless power transmitter receives the control error packet within the second time interval.

12. The wireless power transmitter of claim 11, wherein both the wireless power receiver and the wireless power transmitter are operated based on the second version, and
wherein both the wireless power receiver and the wireless power transmitter are operated based on the EPP.

13. The wireless power transmitter of claim 12, wherein the wireless power transfer standard is a Wireless Power Consortium (WPC) specification, the first version is lower than v1.3, and the second version is v1.3.

14. The wireless power transmitter of claim 12, wherein the first time interval is larger than the second time interval by two times or more.

15. The wireless power transmitter of claim 11, wherein, based on the version of the wireless power transfer standard being the second version higher than the first version, the type of the power profile being the EPP, and transmission of a data packet being needed, the wireless power transmitter receives the control error packet within the second time interval.

16. The wireless power transmitter of claim 11, wherein, according to the type of the power profile and the version of the wireless power transfer standard with which the wireless power receiver and the wireless power transmitter comply, a time-out of the control error packet is determined as a first time-out or a second time-out larger than the first time-out.

17. The wireless power transmitter of claim 16, wherein, based on the version of the wireless power transfer standard being the first version, the time-out for the control error packet is determined as the first time-out, and based on the version of the wireless power transfer standard being the second version higher than the first version and the type of the power profile being the EPP, the time-out for the control error packet is determined as the second time-out.

18. The wireless power transmitter of claim 16, wherein the first time interval is smaller than the first time-out, and the second time interval is smaller than the second time-out.

19. The wireless power transmitter of claim 15, wherein the wireless power transfer standard is a Wireless Power Consortium (WPC) specification, the first version is lower than v1.3, and the second version is v1.3.

20. The wireless power transmitter of claim 15, wherein the first time interval is larger than the second time interval by two times or more.

* * * * *